(12) United States Patent
Kim

(10) Patent No.: US 10,885,229 B2
(45) Date of Patent: Jan. 5, 2021

(54) ELECTRONIC DEVICE FOR CODE INTEGRITY CHECKING AND CONTROL METHOD THEREOF

(71) Applicant: Samsung Electronics Co., Ltd., Suwon-si (KR)

(72) Inventor: In-ho Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 254 days.

(21) Appl. No.: 16/132,754

(22) Filed: Sep. 17, 2018

(65) Prior Publication Data

US 2019/0087185 A1 Mar. 21, 2019

(30) Foreign Application Priority Data

Sep. 20, 2017 (KR) .......................... 10-2017-0121227

(51) Int. Cl.
| | | |
|---|---|---|
| *G06F 21/74* | (2013.01) | |
| *G06F 9/30* | (2018.01) | |
| *G06F 21/64* | (2013.01) | |
| *G06F 12/06* | (2006.01) | |
| *G06F 3/03* | (2006.01) | |

(Continued)

(52) U.S. Cl.
CPC .............. *G06F 21/74* (2013.01); *G06F 3/03* (2013.01); *G06F 9/30043* (2013.01); *G06F 12/063* (2013.01); *G06F 12/1441* (2013.01); *G06F 12/1491* (2013.01); *G06F 21/57* (2013.01); *G06F 21/572* (2013.01); *G06F 21/64* (2013.01); *G06F 2212/1052* (2013.01)

(58) Field of Classification Search
None
See application file for complete search history.

(56) References Cited

U.S. PATENT DOCUMENTS

| 8,166,470 B2 | 4/2012 | Ellison |
| 9,292,684 B2 | 3/2016 | Guidry |
| 9,609,020 B2 | 3/2017 | White et al. |

(Continued)

FOREIGN PATENT DOCUMENTS

| KR | 10-0745640 B1 | 8/2007 |
| KR | 10-2012-0039569 A | 4/2012 |
| KR | 10-1638257 B1 | 7/2016 |

OTHER PUBLICATIONS

Ge et al.; SPROBES: Enforcing Kernel Code Integrity on the TrustZone Architecture; 2014.

(Continued)

*Primary Examiner* — Henry Tsang
(74) *Attorney, Agent, or Firm* — Jefferson IP Law, LLP

(57) ABSTRACT

An electronic device and a control method thereof are provided. The electronic device includes a memory configured to include a non-secure region operating in a normal world and a secure region operating in a secure world, and a processor configured to selectively operate in one of the normal world and the secure world, check integrity of a plurality of code blocks loaded on a first area of the non-secure region while operating in the secure world, and when one of the plurality of code blocks is compromised, change a memory region corresponding to a compromised code block to a secure region, and load an original code block of the compromised code block on a second area of the non-secure region.

20 Claims, 23 Drawing Sheets

(51) Int. Cl.
    *G06F 21/57* (2013.01)
    *G06F 12/14* (2006.01)

(56) References Cited

U.S. PATENT DOCUMENTS

| | | | |
|---|---|---|---|
| 2009/0307770 A1* | 12/2009 | Harris | G06F 21/52 |
| | | | 726/22 |
| 2012/0159193 A1 | 6/2012 | Spradlin | |
| 2012/0331550 A1 | 12/2012 | Raj et al. | |
| 2013/0205403 A1* | 8/2013 | Grocutt | G06F 21/52 |
| | | | 726/27 |
| 2014/0331034 A1* | 11/2014 | Ponce | G06F 9/4401 |
| | | | 713/1 |
| 2015/0150127 A1* | 5/2015 | Ning | G06F 21/57 |
| | | | 726/22 |
| 2015/0154424 A1 | 6/2015 | Mittal | |
| 2015/0199507 A1* | 7/2015 | Azab | G06F 21/53 |
| | | | 726/22 |
| 2016/0328227 A1 | 11/2016 | Kharbanda et al. | |
| 2017/0185781 A1* | 6/2017 | Kim | G09C 1/00 |

OTHER PUBLICATIONS

International Search Report and Written Opinion dated Jan. 10, 2019, issued in an International application No. PCT/KR2018/011127.

* cited by examiner

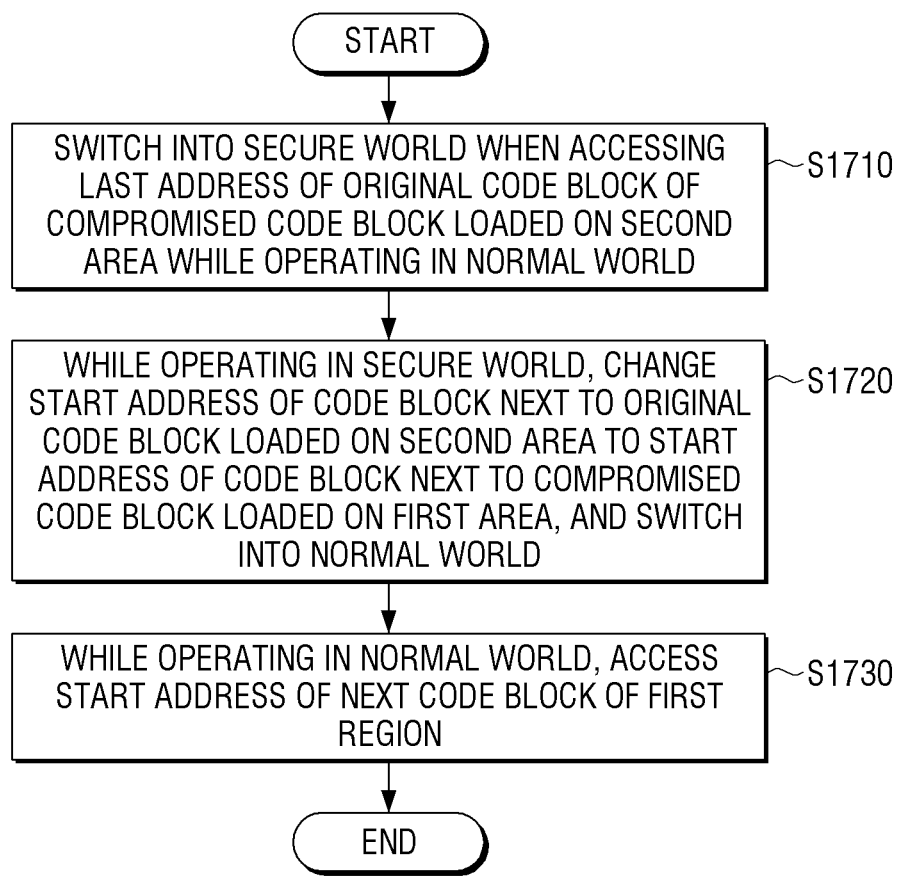

ELECTRONIC DEVICE FOR CODE INTEGRITY CHECKING AND CONTROL METHOD THEREOF

CROSS-REFERENCE TO RELATED APPLICATION(S)

This application is based on and claims priority under 35 U.S.C. § 119(a) of a Korean patent application number 10-2017-0121227, filed on Sep. 20, 2017, in the Korean Intellectual Property Office, the disclosure of which is incorporated by reference herein in its entirety.

BACKGROUND

1. Field

The disclosure relates to an electronic device and a control method thereof. More particularly, the disclosure relates to an electronic device capable of executing a normal code block when a portion of the code block loaded on a memory is compromised by an external attack, and a control method thereof.

2. Description of the Related Art

In accordance with the development of an electronic technology, various types of electronic devices have been developed and popularized. In addition, in accordance with the development of a communication technology together with the development of the electronic technology, the various electronic devices are connected to each other through a wired/wireless network to provide various services to a user. Together with the development of the various electronic devices, various methods for improving security of the electronic devices have been proposed. For example, examples of the related art include a method of stopping an operation of a system and updating the system with a version in which vulnerability is patched, a method of determining a normal operation after a plurality of electronic control units (ECUs) perform the same operation to compare the result, a method of executing a slave operating system (OS) by using a dual OS using a hypervisor, and the like.

Meanwhile, an Internet of Things (IoT) technology that may share information or provide a specific service by connecting living things through the wired/wireless network has recently been developed and various methods for reinforcing security of an IoT device have been discussed.

However, since most of the IoT devices are lightweight/small terminals including only a simple configuration such as a sensor and a low capacity battery, there is a problem that it is difficult to apply a complicated security method in many cases.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or and to provide at least the advantages described below. Accordingly, an aspect of the disclosure is to provide an electronic device capable of accessing an original code block by loading the original code block of a compromised code block to another region of a memory while managing the compromised code block in a secure region, and a control method thereof.

Additional aspects will be set forth in part in the description which follows and, in part, will be apparent from the description, or may be learned by practice of the presented embodiments.

Another aspect of the disclosure is to provide an electronic device. The electronic device includes a memory configured to include a non-secure region operating in a normal world and a secure region operating in a secure world, and a processor configured to: selectively operate in one of the normal world and the secure world, check integrity of a plurality of code blocks loaded on a first area of the non-secure region while operating in the secure world, and when one of the plurality of code blocks is compromised: change a memory region corresponding to a compromised code block to a secure region, and load an original code block of the compromised code block on a second area of the non-secure region.

The processor may be further configured to sequentially access the plurality of code blocks loaded on the first area while operating in the normal world, and switch to operate in the secure world when accessing a start address of the compromised code block while sequentially accessing the plurality of code blocks.

The processor may be further configured to change the start address of the compromised code block to a start address of the original code block loaded on the second area and be switched to operate in the normal world from the secure world, and access the start address of the original code block loaded on the second area while operating in the normal world.

The processor may be further configured to switch into the secure world when accessing a last address of the original code block of the compromised code block loaded on the second area from the normal world, change a start address of a code block next to the original code block loaded on the second area to a start address of a code block next to the compromised code block loaded on the first area and be switched into the normal world from the secure world, and access the start address of the next code block of the first area while operating in the normal world.

The secure region of the memory may further include a firmware integrity check module (FIM) and a hash table corresponding to the plurality of code blocks loaded on the first area, and the processor may be further configured to check whether or not hashes of the plurality code blocks loaded on the first area are compromised using the FIM and the hash table while operating in the secure world.

When one of the plurality of code blocks is compromised, the processor may be further configured to load the compromised code block and original code blocks of code blocks before and after the compromised code blocks together on the second area.

The secure region of the memory may further include a fault control module, and the processor may be further configured to determine whether or not a fault is a fault that occurred due to the compromise of the code block when the fault occurs while the processor operates in the normal world, switch from operating in the normal world to operating in the secure world when the fault occurred due to the compromise of the code block and the original code block of the compromised code block is loaded on the second area, and change the start address of the compromised code block to a memory start address of the original code block loaded on the second area while operating in the secure world.

When the fault is not the fault that occurred due to the compromise of the code block, the processor may be further configured to access an address at which the fault occurs.

When the fault is the fault that occurred due to the compromise of the code block and the original code of the compromised code block is not loaded on the second area, the processor may execute a slave operating system.

In accordance with another aspect of the disclosure, a control method of an electronic device including a memory including a non-secure region operating in a normal world and a secure region operating in a secure region and a processor selectively operating in one of the normal world and the secure world is provided. The electronic device includes checking integrity of a plurality of code blocks loaded on a first area of the non-secure region while operating in the secure world, and changing a memory region corresponding to a compromised code block to the secure region when one of the plurality of code blocks is compromised and loading an original code block of the compromised code block on a second area of the non-secure region.

The control method may further include sequentially accessing the plurality of code blocks loaded on the first area while operating in the normal world, and switching into the secure world when accessing a start address of the compromised code block while sequentially accessing the plurality of code blocks.

The control method may further include changing the start address of the compromised code block to a start address of the original code block loaded on the second area and switching into the normal world from the secure world, and accessing the start address of the original code block loaded on the second area while operating in the normal world.

The control method may further include switching into the secure world when accessing a last address of the original code block of the compromised code block loaded on the second area while operating in the normal world, changing, while operating in the secure world, a start address of a code block next to the original code block loaded on the second area to a start address of a code block next to the compromised code block loaded on the first area and switching into the normal world, and accessing the start address of the next code block of the first area while operating in the normal world.

In the checking of the integrity, whether or not the plurality of code blocks are compromised may be identified by comparing hash information of the plurality of code blocks with a hash table of the secure region, while operating in the secure world.

In the loading of the original code block of the compromised code block on the second area of the non-secure region, the compromised code block and original code blocks of code blocks before and after the compromised code block may be loaded together on the second area.

The control method may further include determining whether or not a fault is a fault that occurred due to the compromise of the code block, when the fault occurs while operating in the normal world, switching from operating in the normal world to operating in the secure world when the fault is the fault that occurred due to the compromise of the code block and the original code block of the compromised code block is loaded on the second area, and changing the start address of the compromised code block to a memory start address of the original code block loaded on the second area, while operating in the secure world.

The control method may further include accessing an address at which the fault occurs when the fault is not the fault that occurred due to the compromise of the code block.

The control method may further include executing a slave operating system when the fault is the fault that occurred due to the compromise of the code block and the original code block of the compromised code block is not loaded on the second area.

In accordance with another aspect of the disclosure, a non-transitory computer-readable recording medium including a program for controlling an electronic device is provided. The program when executed by at least one processor of the electronic device is configured to perform a control method of the electronic device, the control method of the electronic device comprising: checking integrity of a plurality of code blocks loaded on a first area of a non-secure region of memory while operating in a secure world, and changing a memory region corresponding to a compromised code block to a secure region of memory when one of the plurality of code blocks is compromised and loading an original code block of the compromised code block on a second area of the non-secure region.

As described above, according to the diverse embodiments of the disclosure, even in a case in which the code blocks are compromised by an external attack, the electronic device may normally execute uncompromised code blocks.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 17 is a flowchart for describing a process of again accessing, by the processor, a first region from the second region according to an embodiment of the disclosure.

Throughout the drawings, like reference numerals will be understood to refer to like parts, components, and structures.

DETAILED DESCRIPTION

Figure 1:
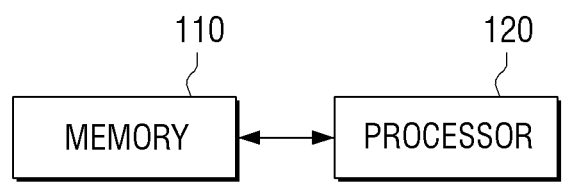
FIG. 1 is a block diagram briefly illustrating a configuration of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As the terms used in embodiments of the disclosure, general terms which are currently used as widely possible as are selected, but may be varied depending on an intention of those skilled in the art, a practice, an emergence of new technologies, and the like. In addition, in a certain case, there are terms which are arbitrarily selected by an applicant, and in this case, a meaning thereof will be described in detail in a description part of the disclosure corresponding to the terms. Therefore, the terms used in the disclosure should be defined based on the meanings of the terms and the contents throughout the disclosure, not simple names of the terms.

Various embodiments of the disclosure may be diversely modified. Accordingly, specific embodiments are illustrated in the drawings and are described in detail in the detailed description. However, it is to be understood that the disclosure is not limited to a specific embodiment, but includes all modifications, equivalents, and substitutions without departing from the scope and spirit of the disclosure. In describing the embodiments, when it is determined that a specific description of known technologies would obscure the gist of the disclosure, a detailed description thereof will be omitted.

Terms such as first, second, etc. can be used to describe various components, but the components should not be limited to the terms. The terms are only used to distinguish one component from the others.

As used herein, the singular forms are intended to include plural forms as well, unless the context clearly indicates otherwise. In the application, the terms "include" or "consist of" intend to designate the presence of features, numbers, operations, components, elements, or a combination thereof that are written in the specification, but do not exclude the presence or possibility of addition of one or more other features, numbers, operations, components, elements, or a combination thereof.

In the embodiment of the disclosure, a 'module' or a 'unit' performs at least one function or operation, and may be implemented in hardware, software, or a combination of hardware and software. In addition, a plurality of 'modules' or a plurality of 'units' may be integrated into at least one module and may be implemented in at least one processor (not shown), except for a 'module' or a 'unit' in which they need to be implemented in specific hardware.

In the embodiment of the disclosure, a case in which any one part is "connected" with the other part includes a case in which the parts are "directly connected" with each other and a case in which the parts are "electrically connected" with each other with other elements interposed therebetween. In addition, unless explicitly described to the contrary, "comprising" any components will be understood to imply the inclusion of other elements rather than the exclusion of any other elements.

Hereinafter, embodiments of the disclosure will be described in detail with reference to the accompanying drawings so that those skilled in the art may easily practice the disclosure. However, the disclosure may be implemented in various different ways and is not limited to the embodiments provided in the description. In the accompanying drawings, portions unrelated to the description will be omitted in order to obviously describe the disclosure, and similar reference numerals will be used to describe similar portions throughout the specification.

In addition, in the embodiments of the disclosure, an "application" is referred to a collection of a series of computer programs devised to perform a specific task. In the embodiments of the disclosure, various applications may be. For example, examples of the application may include a game application, a video play application, a map application, a memo application, a calendar application, a phone book application, a broadcasting application, an exercise supporting application, a payment application, a picture folder application, a medical instrument control application, a user interface providing application of a plurality of medical instruments, and the like, but are not limited thereto.

FIG. 1 is a block diagram briefly illustrating a configuration of an electronic device according to an embodiment of the disclosure.

As illustrated in FIG. 1, an electronic device 100 includes a memory 110 and a processor 120. Here, the electronic device 100 may be implemented as a smartphone, but this is merely one example, and may include at least one of the smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an moving picture experts group phase 1 or phase 2 (MPEG-1 or MPEG-2) audio layer 3 (MP3) player, a mobile medical instrument, a camera, and a wearable device. According to diverse embodiments, the wearable device may include at least one of an accessory type (e.g., watches, rings, bracelets, braces, necklaces, glasses, contact lenses, or head-mounted-devices (HMD)), fabric or clothing-integrated type (e.g., electronic clothes), body-attached type (e.g., skin pad or tattoo), and a bio-implanted type (e.g., an implantable circuit).

As another example, the electronic device 100 may be a home appliance. The home appliance may include, for example, at least one of a television, a digital versatile disc (DVD) player, an audio, a refrigerator, an air conditioner, a cleaner, an oven, a microwave oven, a washing machine, an air purifier, a set-top box, a home automation control panel, a security control panel, a television (TV) box (e.g., Samsung HomeSync™, AppleTV™, or Google TV™), a game console (e.g., Xbox™, PlayStation™), an electronic dictionary, an electronic key, a camcorder, and an electronic frame.

As still another example, the electronic device 100 may include at least one of a variety of medical instruments (e.g., a variety of portable medical measuring devices (a blood glucose meter, a heart rate meter, a blood pressure meter, a body temperature measuring instrument, or the like), magnetic resonance angiography (MRA), magnetic resonance imaging (MRI), computed tomography (CT), a radiograph, a ultrasonic device, or the like), a navigation device, a satellite navigation system (a global navigation satellite system (GNSS)), an event data recorder (EDR), a flight data recorder (FDR), a vehicle infotainment device, electronic equipment for marine (e.g., a navigation device for marine, a gyrocompass, and the like), avionics, a security device, a head unit for vehicle, industrial or home robots, automated teller machines (ATM) of financial institution, point of sales (POS) of stores, or Internet of Things devices (e.g., light bulbs, various sensors, electricity or gas meters, sprinkler devices, fire alarms, thermostats, street lights, toasters, exercise equipment, hot water tank, heaters, boilers, etc.).

As still another example, the electronic device 100 may include at least one of a portion of furniture or a building/structure, an electronic board, an electronic signature receiving device, a projector, or various measuring devices (e.g., water, electricity, gas, or radio wave measuring instruments).

The memory 110 may store a variety of programs and data necessary to operate the electronic device 100. The memory 110 may be implemented as a non-volatile memory, a volatile memory, a flash-memory, a hard disk drive (HDD), a solid state drive (SSD), or the like.

The memory 110 may be accessed by the processor 120, where reading/recording/edition/deletion/updating, etc., of data by the processor 120 may be performed. In the disclosure, a term "memory" may include the memory 110, a read only memory (ROM) 122 in the processor 120, a random access memory (RAM) 121, or a memory card (not illustrated) (e.g., a micro SD card, a memory stick, or the like) mounted in the electronic device 100. In addition, in the disclosure, an operation of reading/recording/edition/deletion/updating the data of the memory 110 by the processor 120 is expressed as "the processor 120 accesses the memory 110". That is, in general, the processor 120 accesses the memory 110 and performs functions of reading/recording/edition/deletion/updating, etc. according to the contents stored in the memory 110, but in the disclosure, the expression "the processor 120 accesses the memory 110" is described as including a process in which the processor 120 accesses the memory 110 to execute the functions of the reading/recording/edition/deletion/updating, etc.

The processor 120 controls an overall operation of the electronic device 100. In this case, the processor 120 is selectively operable in one of a normal world and a secure world.

The secure world means a data processing architecture securing security, and the normal world means a general data processing architecture.

As an example, as the processor 120, "an ARM trustzone architecture" may be used. As the "ARM trustzone architecture", two divided runtime-architectures of ARM Inc. for micro process system are known. Such runtime-architectures include two runtime environments. A non-secure runtime environment, which is one of the two runtime environments, may be referred to as a "normal zone" or a "normal world". The non-secure runtime environment may be controlled by a normal operating system. The security runtime environment, which is the other runtime environment, may be referred to as a "trustzone", or a "trusted-world", or a "secure world". The security runtime environment is controlled by a safety operating system.

The normal operating system may be a conventional operating system such as, for example, Android, Windows Phone, Symbian, etc. and the safety operating system may be, for example, an operating system in which a security kernel integrated with security functions is inserted into an existing operating system such as MOBICORE, RedCastle, and the like. According to the ARM trust zone, the non-secure runtime environment and the security runtime environment described above may be defined as virtual execution environments.

Here, the conditions for the processor 120 to operate in one of the normal world and the secure world may be diverse. As an example, the processor 120 may be selectively operated in one of the normal world and the secure world according to a user input. Specifically, when a user selects a first menu (or a first button, a first touch input, and the like) for using the normal world, the processor 120 executes an operating system (OS) operating in the normal world and operates in the normal world. On the other hand, when the user selects a second menu (or a second button, a second touch input, and the like) for using the secure world, the processor 120 executes an OS operating in the secure world and operates in the secure world.

As still another example, a normal OS or a secure OS may also be set to a default. For example, if the normal OS is set to a default OS, when the electronic device 100 is booted or other specific events occur, the processor 120 executes the normal OS and immediately operates in the normal world. In this state, if the user selects the second menu (or the second button), the processor 120 executes the secure OS and operates in the secure world. Thereafter, if the user selects the first menu (or the first button), the processor 120 executes the normal OS and again operates in the normal world.

As still another example, in a case in which the normal OS is executed, when the second menu (or the second button) is selected, the processor 120 terminates the electronic device 100 and then re-boots the electronic device 100 to allow the secure OS to be executed.

As still another example, in a case in which a user action is not performed for a predetermined time in a state in which the normal OS is executed, the processor 120 may terminate the normal OS and operate the secure OS. Similarly, in a case in which a user action is not performed for a predetermined time in a state in which the secure OS is executed, the processor 120 may terminate the secure OS and operate the normal OS.

Meanwhile, in the embodiment described above, it may be understood that the normal world and the secure world are executed based on the OS corresponding to each of the normal world and the secure world, but when application generates data requiring security during the execution of the normal OS, the processor 120 may also transmit the corresponding data to the secure world.

For example, when the processor 120 accesses a specific address of the memory 110 to execute a specific application that operates in the normal world, the processor 120 may perform an operation on the normal world OS. In a case in which an address of the memory 110 indicated by the specific application is a secure world region that operates in the secure world while the processor 120 is executed in the normal OS, the processor 120 may transmit the data generated in the normal OS to the secure world and operate in the secure OS.

The secure world may include a variety of software such as a network driver module, a transmission control protocol/internet protocol (TCP/IP) module, and the like separately from the normal world to reinforce security. Alternatively, the secure world itself may also be implemented with independent hardware that is different from the normal world. For example, the secure world and the normal world may also be implemented with different system on chip (SoC) or different processors. Alternatively, the secure world and the normal world may also be implemented with two regions that one processor is logically divided.

Meanwhile, the processor 120 may divide the region of the memory 110 into a non-secure region operating in the normal world and a secure region operating in the secure world. In this case, if the processor 120 intends to perform an application operating in the normal world, the processor 120 may load a program necessary to execute the application on the memory such as RAM. In this case, the program necessary to execute the application may be loaded on the memory in a unit of blocks, and each of the blocks may include a hash for checking whether or not the block is compromised. In addition, the processor 120 may store a hash table of the blocks in the secure region of the memory 110.

That is, the processor 120 may load the program operating in the normal world in the non-secure region of the memory 110 in a unit of blocks, and may store data for checking whether or not the program operating in the normal world is compromised in the secure region of the memory 110.

In the case in which the data is loaded on the memory 110, the processor 120 may check integrity of a plurality of code blocks loaded on a first region of the non-secure region of the memory 110 in the secure world. As described above, the integrity check of the plurality of code blocks loaded on the first region may be performed by using the hash table loaded on the secure region of the memory 110.

In this case, the integrity check of the plurality of code blocks loaded on the first region may be performed per a predetermined time. However, the integrity check is not limited thereto, but may be performed according to a user instruction. Alternatively, the integrity check may also be performed whenever the code blocks loaded on the first region are executed.

In a case in which at least one code block of the plurality of code blocks loaded on the first region is compromised, the processor 120 may change a memory region corresponding to the compromised code block to the secure region, and may load an original code block of the compromised code block on a second region of the non-secure region of the memory 110. That is, in a case in which the code block is compromised in a situation in which the processor 120 executes the code block loaded on the first region, the processor 120 may change a region of the compromised code block to the secure region to prevent the compromised code block from being executed, and may execute the code block loaded on the second region.

Specifically, in a case in which the plurality of code blocks loaded on the first region are intended to be executed, the processor 120 may sequentially access the plurality of code blocks loaded on the first region while being operated in the normal world. In a case in which the processor 120 accesses a start address of the compromised code block while sequentially accessing the plurality of code blocks, the processor 120 may stop the operation in the normal world and operate in the secure world.

Specifically, as described above, the start address of the compromised code block exists in the secure region of the memory 110. Therefore, in a case in which the processor 120 accesses the start address of the compromised code block while operating in the normal world, a fault may occur. In a case in which the fault occurs, the processor 120 may stop the operation in the normal world and operate in the secure world.

In this case, the processor 120 may change the start address of the compromised code block to a start address of an original code block loaded on the second region while operating in the secure world, and may be switched into the normal world. While the processor 120 operates in the normal world, the processor 120 may access the start address of the original code block loaded on the second region to execute the program. That is, the processor 120 may access the original code block instead of the compromised code block to normally execute the program.

Meanwhile, in the embodiment described above, the processor 120 loads only the compromised code block on the second region, but is not limited thereto. That is, the processor 120 may load code blocks before and after the compromised code block on the second region. A detailed description thereof will be provided below.

In a case in which the processor 120 accesses a last address of the original code block of the compromised code block loaded on the second region while operating in the normal world, the processor 120 may be switched into the secure world. While the processor 120 operates in the secure world, the processor 120 may change a start address of a code block next to the original code block loaded on the second region to a start address of a code block next to the compromised code block loaded on the first region and may again be switched into the normal world.

While the processor operates in the normal world, the processor 120 may access the start address of the next code block of the first region.

As a result, the processor 120 may access a specific address of the non-secure region to execute the program, and such an operation may be performed in the normal world. In addition, in a case in which an access address of the memory 110 is changed in relation to the compromised code block, the processor 120 may manage the changed access address in the secure world. Even in a case in which a specific code block is compromised by an external attack, the processor 120 may execute the original code block without complicated action. A detailed example will be described below.

Figure 2:
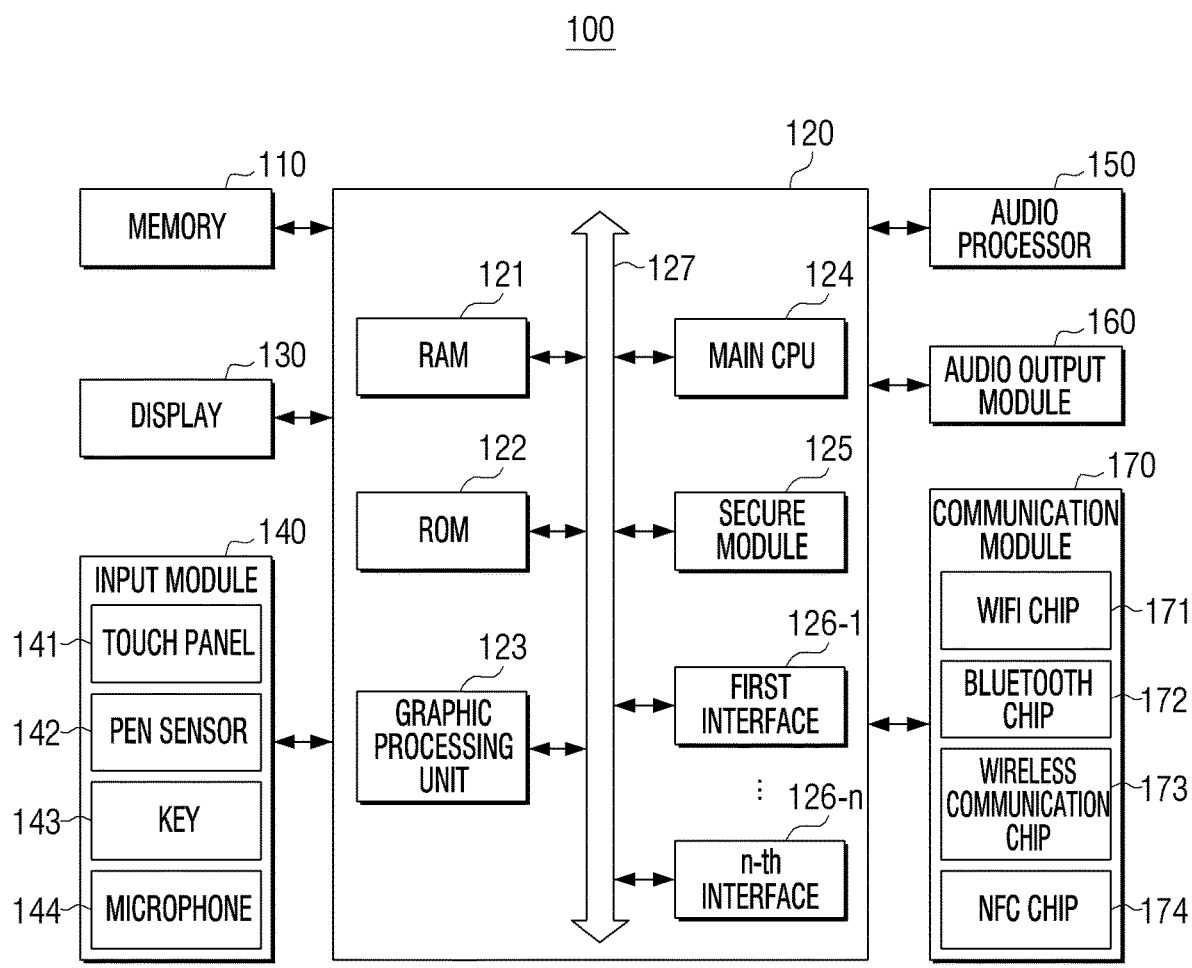
FIG. 2 is a block diagram illustrating the configuration of the electronic device 100 according to an embodiment of the disclosure in detail.

FIG. 2 is a block diagram illustrating the configuration of the electronic device 100 according to an embodiment of the disclosure in detail. Referring to FIG. 2, the electronic device 100 may further include a display 130, an input module 140, an audio processor 150, an audio output module 160, and a communication module 170, in addition to the memory 110 and the processor 120. However, the electronic device 100 is not limited to the above-mentioned configuration, but some components may be added or omitted, if necessary.

The memory 110 may store a variety of programs and data necessary to operate the electronic device 100 as described above. In this case, the memory 110 may include a hard disk, a memory, a cache, and a resister. In addition, in the disclosure, the memory 110 may include a ROM, a RAM, and the like in the processor 120. As described above, the memory 110 may store the normal OS and the secure OS, and may read/record/edit/delete/update the data according to the control of the processor 120.

As described above, the memory 110 may be divided into the secure region and the non-secure region and may include various modules for executing the program and the like. For example, the secure region of the memory 110 may further include a firmware integrity check module (FIM), a hash table corresponding to the code blocks loaded on the first region, and a fault handler module (FHM).

The FIM and the hash table corresponding to the code blocks loaded on the first region may be used to check integrity of the code blocks loaded on the non-secure region of the memory 110. Specifically, the processor 120 may control the FIM to determine whether or not a hash included in each of the code blocks of the non-secure region is the same as a hash of the hash table. In a case in which the hash of each of the code blocks is the same as the hash of the hash table, the processor 120 may determine that the code block is not compromised. In a case in which the hash of each of the code blocks is different from the hash of the hash table, the processor 120 may determine that the code block is compromised.

The FHM is a module for controlling an occurred fault when the fault occurs while the processor operates in the normal world. For example, in a case in which the processor 120 accesses the secure region while operating in the normal world, the fault may occur. In a case in which the fault occurs, the operation in the normal world may be changed to the operation in the secure world. In this case, the processor 120 may control the FHM operating in the secure world to analyze the occurred fault. Specifically, the processor 120 may control the FHM to determine a memory address at which the fault occurs, a reason that the fault occurs, and an operation in the normal world corresponding to the occurred fault (for example, an operation of newly designating a memory address to be accessed or stopping the operation in the normal world).

In this case, the reason that the fault occurs may be diverse. For example, when a necessary program is not loaded on the memory 110, the fault may occur. In this case, the processor 120 may load a missing program on the memory 110 and return to a fault occurrence point.

Alternatively, according to an embodiment of the disclosure, the processor 120 accesses the compromised code block changed to the secure region while operating in the normal world, resulting in the fault. In this case, the processor 120 may access the start address of the original code block loaded on the second region.

That is, the FHM may analyze the reason that the fault occurs, and the processor 120 may control the FHM to perform an operation corresponding to each of the reasons that the fault occurs.

The display 130 may display various screens on a display region. For example, the display 130 may display contents such as an application execution screen, an image, a video, a text, and the like.

In this case, the display 130 may be implemented with various types of display panels. For example, the display panel may be implemented with various display technologies such as a liquid crystal display (LCD), an organic light emitting diodes (OLED), an active-matrix organic light-emitting diode (AM-OLED), a liquid crystal on silicon (LcoS), a digital light processing (DLP), and the like.

In addition, the display 130 may also be coupled to at least one of a front region, a side region, and a rear region of the electronic device 100 in a form of a flexible display. The flexible display may be bent, folded, or rolled without being damaged using a thin and flexible substrate such as a paper. The above-mentioned flexible display may also be manufactured using a plastic substrate as well as a glass substrate which is generally used. In the case in which the plastic substrate is used, the flexible display may be formed by using a low temperature manufacturing processor without using an existing manufacturing processor in order to prevent damage of the substrate. In addition, it is possible to give the flexible display flexibility to fold and unfold the flexible display by replacing the glass substrate wrapping a flexible liquid crystal with a plastic film. The above-mentioned flexible display has advantages that it is thin and light, is shock-resistant, may be bent or folded, and may be manufactured in various forms.

In a case in which the electronic device 100 according to an embodiment of the disclosure is a small IOT device without having the display 130, the display 130 may be implemented as a user terminal controlling the small IOT device.

The input module 140 may include a touch panel 141, a pen sensor 142, a key 143, and a microphone 144 to receive various inputs. The touch panel 141 may be formed by coupling the display 130 and a touch sensor (not shown) to each other, and as the touch sensor, at least one of a capacitive touch sensor, a resistive touch sensor, an infrared touch sensor, and an ultrasonic touch sensor may be used. The touch panel may have a function that detects a position of a touch input, a touched area, and pressure of the touch input as well as a display function, and may also have a function that detects a proximity touch as well as a real-touch. The pen sensor 142 may be implemented as a portion of the touch panel 141, or may include a separate recognition sheet. The key 143 may include a physical button, an optical key, or a key pad. The microphone 144 may include at least one of an embedded microphone and an external microphone.

In particular, the input module 140 may receive external instructions from the various components described above and transmit the instructions to the processor 120. The processor 120 may generate control signals corresponding to the received inputs to control the electronic device 100.

The audio processor 150 is a component performing a processing for audio data. The audio processor 150 may perform various processes such as decoding, amplification, noise filtration, and the like for the audio data. The audio data processed by the audio processor 150 may be output to the audio output module 160.

The audio output module 160 is a component that outputs a variety of alarm sounds or voice messages as well as a variety of audio data for which various processing tasks such as decoding, amplification, and noise filtration are performed by the audio processor 150. In particular, the audio output module 160 may be implemented as a speaker, but is merely an example. For example, the audio output module 160 may be implemented as an output terminal capable of outputting the audio data.

The communication module 170 may perform communication with an external device. Specifically, the communication module 170 may include various communication chips such as a Wi-Fi chip 171, a Bluetooth chip 172, a wireless communication chip 173, a near field communication (NFC) chip 174, and the like. Here, the Wi-Fi chip 171, the Bluetooth chip 172, and the NFC chip 174 perform communication in a local area network (LAN) scheme, a Wi-Fi scheme, a Bluetooth scheme, and an NFC scheme, respectively. In the case in which the Wi-Fi chip 171 or the Bluetooth chip 172 is used, a variety of access information such as service set identifier (SSID), a session key, and the like may be first transmitted and received, a communication access may be performed using the variety of access information, and a variety of information may be then transmitted and received. The wireless communication chip 173 means a chip that performs communication according to various communication standards such as IEEE, ZigBee, 3rd generation (3G), 3rd generation partnership project (3GPP), long term evolution (LTE), and the like.

The processor 120 may control an overall operation of the electronic device 100 using a variety of programs stored in the memory 110.

The processor 120 may include a random access memory (RAM) 121, a read only memory (ROM) 122, a graphic processing unit 123, a main central processing unit (CPU) 124, a security module 125, first to n-th interfaces 126-1 to 126-n, and a bus 127. Here, the RAM 121, the ROM 122, the graphic processing unit 123, the main CPU 124, the security module 125, the first to n-th interfaces 126-1 to 126-n, and the like may be connected to each other through the bus 127.

The RAM 121 stores an O/S and an application program. Specifically, when the electronic device 100 is booted, the O/S may be stored in the RAM 121 and a variety of application data selected by the user may be stored in the RAM 121.

The ROM 122 stores a set of instructions for booting a system, and the like. When a turn-on instruction is input to supply power to the system, the main CPU 124 copies the O/S stored in the memory 110 to the RAM 121 according to the instructions stored in the ROM 122, and executes the O/S to boot the system. When the booting of the system is completed, the main CPU 124 copies a variety of application programs stored in the memory 110 to the RAM 121, and executes the application programs copied to the RAM 121 to perform a variety of operations.

The graphic processing unit 123 generates a screen including various objects such as an item, an image, a text, and the like using a calculating module (not shown) and a rendering module (not shown). Here, the calculating module may be a component that calculates attribute values such as coordinate values, shapes, sizes, colors, and the like in which the respective objects are to be displayed according to a layout of the screen, using a control instruction received from the input module 140. In addition, the rendering module may be a component that generates the screen of various layouts including the objects, based on the attribute values calculated by the calculating module. The screen generated by the rendering module may be displayed in a display region of the display 130.

The main CPU 124 accesses the memory 110 and performs a booting using the O/S stored in the memory 110. In addition, the main CPU 124 performs various operations using a variety of programs, contents, data, and the like stored in the memory 110.

The security module 125 may distinguish the normal world and the secure world. Specifically, the security module 125 may divide an address space of the memory into a secure region and a non-secure region, and may control an access of the memory 110 when there is no authority. If necessary, the security module 125 may change the address space of the memory from the secure region to the non-secure region, or from the non-secure region to the secure region. For example, in a case in which a specific code block of the non-secure region is compromised, the security module 125 may change the compromised code block to the secure region. In this case, when accessing the memory 110 of the code block region compromised in the normal world, the security module 125 may block the main CPU 124 from accessing the memory 110 or control the main CPU 124 to access the memory 110 in the secure world.

The security module 125 may be implemented as a trustzone address space controller (TZASC) included in a cortexA series or a secure attribute unit (SAU) included in a cortexM series of ARM Inc.

The first to n-th interfaces 126-1 to 126-n are connected to the variety of components described above. One of the first to n-th interfaces 126-1 to 126-n may be a network interface connected to an external device through a network.

Hereinafter, a software architecture structure stored in the memory 110 will be described with reference to FIGS. 3 and 4. In particular, FIG. 3 is a diagram for describing software of a normal world using a normal OS and FIG. 4 is a diagram for describing software driving a normal OS and a secure OS together.

Figure 3:
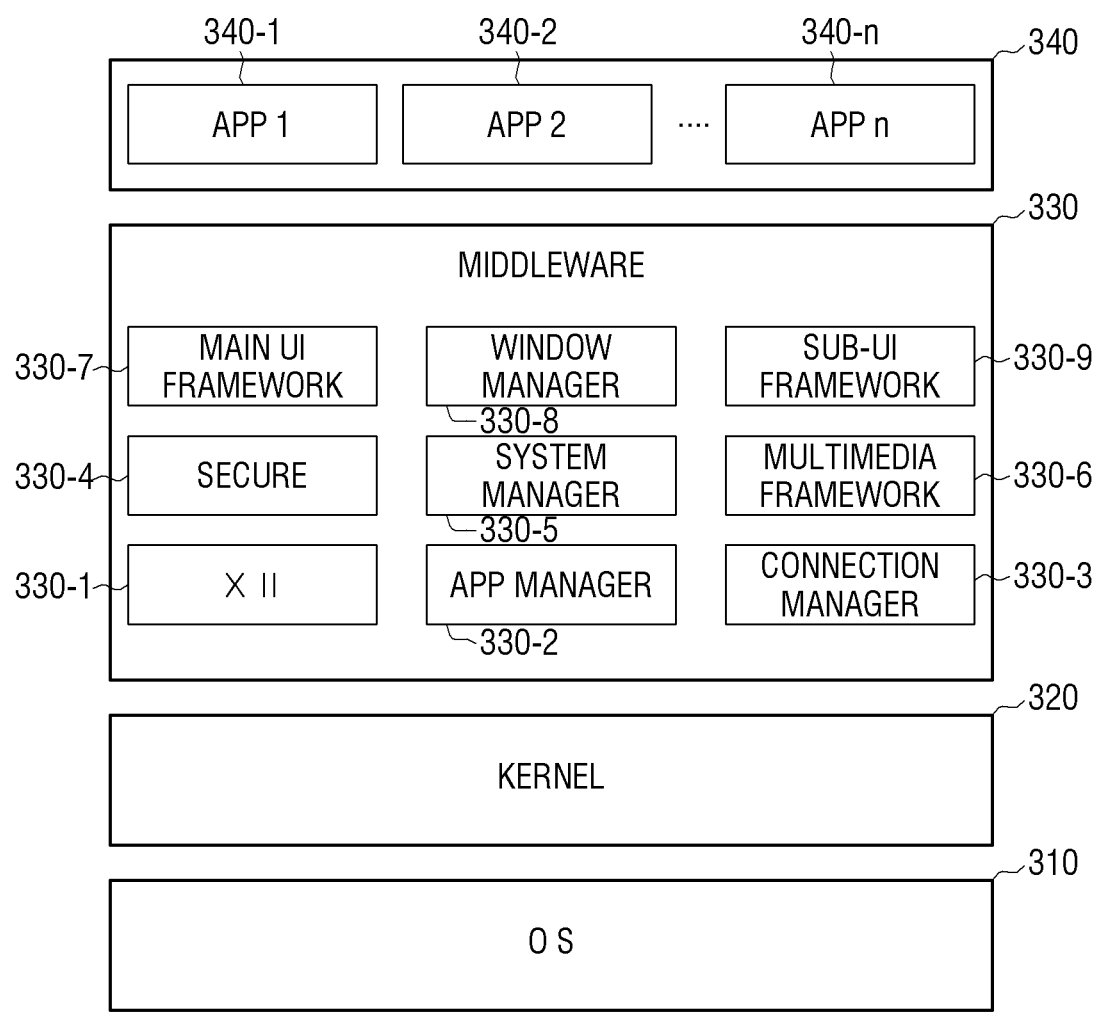
FIG. 3 is a diagram for describing software of a normal world using a normal OS according to an embodiment of the disclosure.
Figure 4:
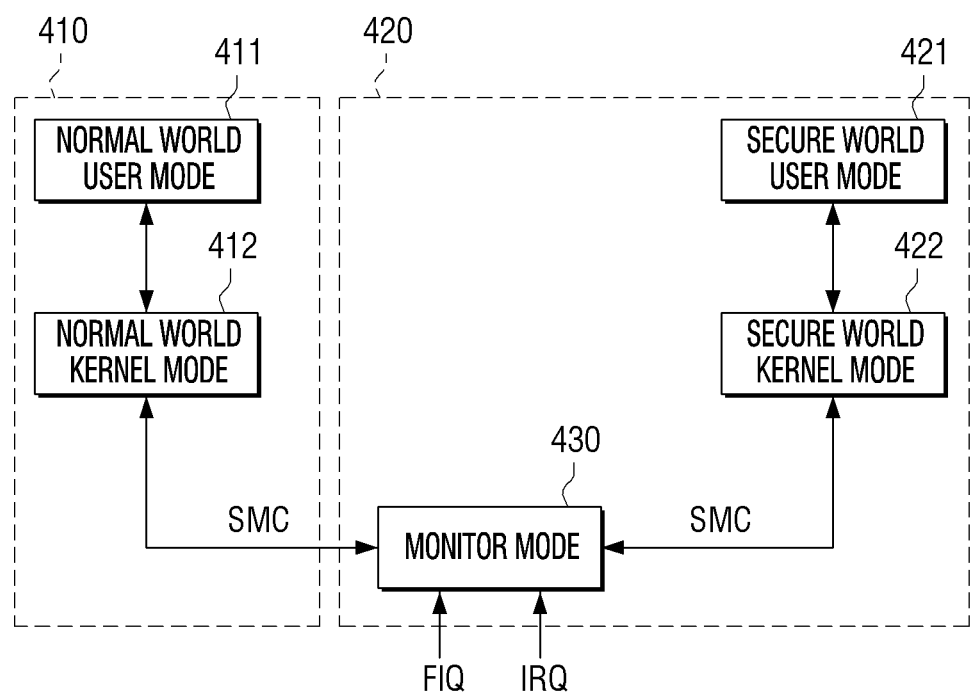
FIG. 4 is a diagram for describing software driving a normal operating system (OS) and a secure OS together according to an embodiment of the disclosure.

Referring to FIG. 3 according to an embodiment of the disclosure, the normal world of the memory 110 may include a normal OS 310, a kernel 320, middleware 330, an application module 340, and the like.

The normal OS 310 performs a function that controls and manages an overall operation of hardware. That is, the normal OS 310 is a layer which is responsible for a basic function such as a hardware management, a memory, security, or the like.

The kernel 320 serves as a passage through which a variety of signals including the touch signal input through the input device are transmitted to the middleware 330.

The middleware 330 includes a variety of software modules controlling the operation of the electronic device 100. Referring to FIG. 3, the middleware 330 includes an X11 module 330-1, an APP manager 330-2, a connection manager 330-3, a secure module 330-4, a system manager 330-5, a multimedia framework 330-6, a main UI framework 330-7, a window manager 330-8, and a sub-UI framework 330-9.

The X11 module 330-1 is a module receiving a variety of event signals from a variety of hardware included in the electronic device 100. Here, the event may be variously set such as an event in which the user gesture is sensed, an event in which a system alarm is generated, an event in which a specific program is executed or terminated, and the like.

The APP manager 330-2 is a module managing an execution state of a variety of applications 340-1 to 340-n installed in the memory 110. If an application execution event is sensed from the X11 module 330-1, the APP manager 330-2 calls and executes an application corresponding to the corresponding event.

The connection manager 330-3 is a module for supporting a wired or wireless network connection. The connection manager 330-3 may include various sub-modules such as a DNET module, a universal plug and play (UPnP) module, and the like.

The secure module 330-4 is a module for supporting certification, request permission, secure storage, and the like for hardware.

The system manager 330-5 monitors states of the respective components in the electronic device 100 and provides the monitored results to other modules. If a case in which battery remainder is lack or error occurs, a case in which a communication connection is disconnected, and the like occur, the system manager 330-5 may provide the monitored results to the main UI framework 330-7 or the sub-UI framework 330-9 to output an alarm message or an alarm sound.

The multimedia framework 330-6 is a module for performing a playback of multimedia contents stored in the electronic device 100 or provided from an external source. The multimedia framework 330-6 may include a player module, a camcorder module, a sound processing module, and the like. Accordingly, the multimedia framework may perform an operation of reproducing a variety of multimedia contents to generate and reproduce the screen and the sound.

The main UI framework 330-7 is a module for providing a variety of UIs to be displayed on a main region of the display 130, and the sub-UI framework 330-9 is a module for providing a variety of UIs to be displayed on a sub-region. The main UI framework 330-7 and the sub-UI framework 330-9 may include an image compositor module for configuring a variety of UI elements, a coordinate compositor module for calculating coordinates at which the UI elements are to be displayed, a rendering module for rendering the configured UI elements to the calculated coordinates, a 2D/3D UI toolkit for providing a tool for configuring a 2D or 3D type of UI, and the like.

The window manager 330-8 may sense a touch event using a body of the user or a pen, or other input events. If the window manager 330-8 senses the above-mentioned event, the window manager 330-8 transmits the event signal to the main UI framework 330-7 or the sub-UI framework 330-9 to perform an operation corresponding to the event.

The application module 340 includes applications 340-1 to 340-n for supporting various functions. For example, the application module 340 may include program modules for providing various services such as a navigation program module, a game module, an electronic book module, a calendar module, an alarm management module, and the like. The above-mentioned applications may also be installed to default, and may also be arbitrarily installed and used by the user during a use process. If the UI element is selected, the main CPU may execute an application corresponding to the selected UI element by using the application module 340.

The structure of the normal world illustrated in FIG. 3 is merely an example, and is not necessarily limited thereto. Therefore, some of structure of the normal world may also be omitted, modified, or added depending on a kind of the electronic device 100 or a purpose of the electronic device 100. For example, the memory 110 may also additionally include various programs such as a sensing module for analyzing signals sensed by a variety of sensors, a messaging module such as a messenger program, a text message program, an e-mail program, or the like, a call info aggregator program module, a voice over internet protocol (VoIP) module, a web browser module, and the like.

FIG. 4 is an illustrative diagram for describing a software architecture for a method of operating the processor 120 in the normal world 410 and the secure world 420 according to an embodiment of the disclosure.

Referring to FIG. 4, the trustzone architecture may provide two runtime environments of the normal world 410 and the secure world. Here, the normal world 410 may include a normal world user mode 411 and a normal world kernel mode 412, and the secure world 420 may include a secure world user mode 421, a secure world kernel mode 422, and a monitor mode 430. Here, each world may virtually divide and manage hardware resources such as cache, translation lookaside buffer (TLB), memory management unit (MMU), resister, and the like.

As described above, since the normal world 410 and the secure world 420 may be selectively operated, the trustzone architecture may provide the monitor mode 430 to manage a change of the normal world 410 and the secure world 420. Here, software of the monitor mode 430 may operate in secure world 420.

Specifically, in a case in which the change is made from normal world 410 to the secure world 420, or from the secure world 420 to the normal world 410, the monitor mode 430 may store a hardware context of a currently executed world and recover a new world context. For example, in the case in which the change is made from the normal world 410 to the secure world 420, an execution environment of the normal world 410 may be stored in the monitor mode 430. Therefore, in a case in which the program operates in the secure world 420 and then operates in the normal world 410, the program may be executed in a previously stored environment of the normal world 410.

Meanwhile, as illustrated in FIG. 4, since the normal world 410 and the secure world 420 are controlled by the monitor mode 430, various instructions or interrupts generated by the processor 120 may be transmitted to each world through the monitor mode. For example, the normal world kernel mode or the secure world kernel mode may be connected to each other using a secure monitor call (SMC) instruction.

That is, the processor 120 may enter the monitor mode 430 using the SMC instruction, and the processor 120 may change the currently executed mode (the normal world kernel mode 412 or the secure world kernel mode 422) to the monitor mode 430 using the SMC instruction. However, in addition to using the SMC instruction, the processor 120 may also change the currently executed mode to the monitor mode using an interrupt request (IRQ) or a fast interrupt request (FIQ). In general, the IRQ may be used as an interrupt of the normal world 410 and the FIQ may be used as an interrupt of the secure world 420.

Meanwhile, as illustrated in FIG. 4, the normal world 410 and the secure world 420 may be managed by the monitor mode 430 software, but may also be managed by a separate hardware configuration. For example, the hardware security module 125 such as SAU and TZASC described above may also manage the normal world 410 and the secure world 420. Although a main embodiment of the disclosure is described based on the case in which the security module 125 configured by hardware manages the normal world 410 and the secure world 420, the normal world 410 and the secure world 420 may also be managed by software of the monitor mode 430.

Hereinafter, a security method according to the disclosure will be described with reference to FIGS. 5 to 11.

Figure 5:
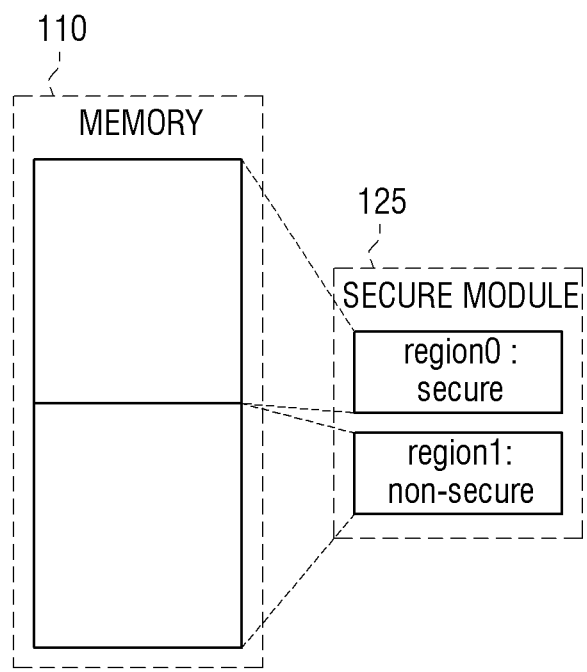
FIG. 5 is an illustrative diagram for describing a memory and a security module according to an embodiment of the disclosure.

As illustrated in FIG. 5, the security module 125 may divide and manage the memory 110 into the secure region and the non-secure region. Specifically, as described above, the security module 125 may divide and manage one memory into the secure region and the non-secure region. Here, in a case in which the processor 120 operates in the normal world, the processor 120 may access only the non-secure region of the memory 110. In a case in which the processor 120 accesses the secure region of the memory 110 while operating in the normal world, the security module 125 may control the access of the processor 120 to allow a fault signal to occur. In a case in which the fault occurs, the processor 120 may switch the operation in the normal world into the operation in the secure world.

Meanwhile, in a case in which the processor 120 operates in the secure world, the processor 120 may access both the secure region and the non-secure region of the memory 110. That is, while the processor 120 operates in the secure world, the processor 120 may check an overall region of the memory, but while the processor 120 operates in the normal mode, the processor 120 may check only a memory region corresponding to the non-secure region.

Meanwhile, although the disclosure describes the method in which the security module 125 divides and manages one memory 110 into the secure region and the non-secure region, a plurality of memories may be divided and managed into the secure region and the non-secure region.

Meanwhile, in the embodiment below, a description is made based on that the use of the memory in the secure region means that the process operates in the secure world, and the use of the memory in the non-secure region means that the processor operates in the normal world, unless specifically stated otherwise. That is, even if there is no specific description as to whether each operation operates in the normal world or in the secure world, it is interpreted that when the processor 120 accesses the memory of the secure region, the processor operates in the secure world, and when the processor 120 accesses the memory of the non-secure region, the processor 120 operates in the normal world.

Figure 6:
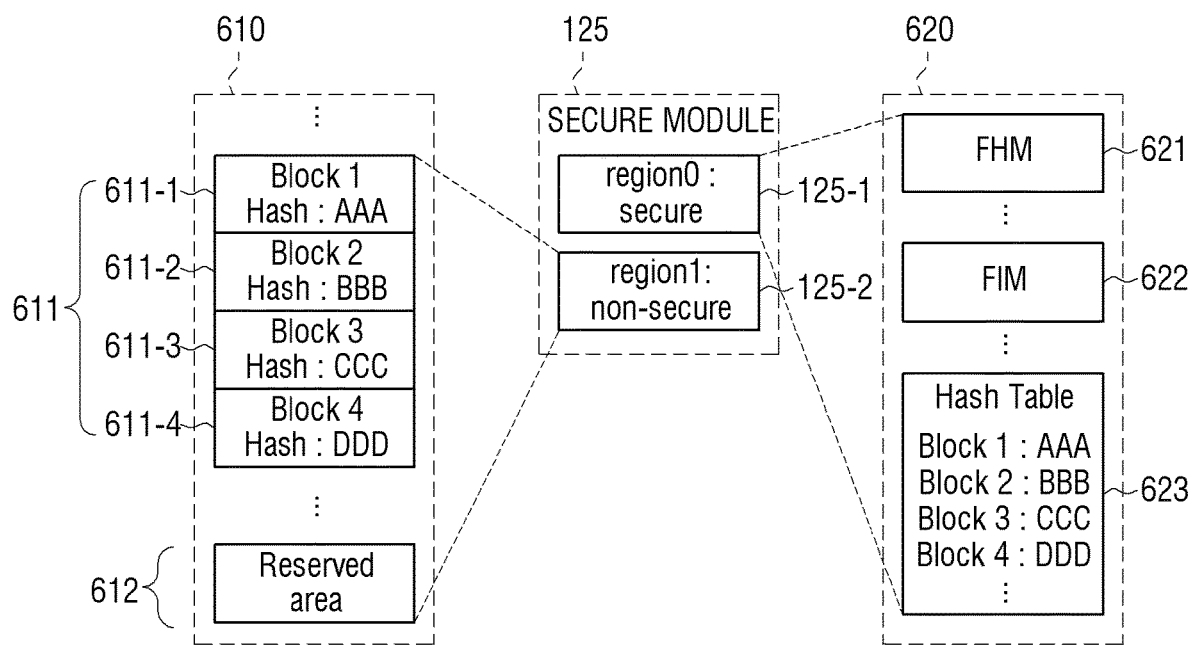
FIG. 6 is an illustrative diagram for describing various modules loaded to a secure region and a non-secure region according to an embodiment of the disclosure.

FIG. 6 is an illustrative diagram for describing various modules loaded on a secure region and a non-secure region according to an embodiment of the disclosure. For convenience of explanation, hereinafter, a memory region on the left of the security module 125 is referred to as the non-secure region and a memory region on the right of the security module 125 is referred to as the secure region. However, as described above, the secure region and the non-secure region may also be configured by one memory 110.

Referring to FIG. 6, the security module 125 may include a secure management region 125-1 and a non-secure management region 125-2. The secure management region 125-1 may mange a secure region 620 of the memory 110, and the non-secure management region 125-2 may manage a non-secure region 610 of the memory 110.

The non-secure region 610 may include a first area 611 and a second area 612. Here, code blocks necessary to execute the program may be loaded on the first area 611. Specifically, in a case in which the memory 110 is the RAM, the processor 120 may copy necessary programs among various programs stored in the ROM and load the programs thereon. The code block loaded on the RAM may be a kernel code block, but is not limited thereto.

A plurality of code blocks 611-1 to 611-4 may be loaded on the first area 611. Although FIG. 6 describes a case in which four code blocks are loaded, the number of the code blocks may be diverse.

The respective code blocks 611-1 to 611-4 may include a source code for program execution and hashes corresponding to the respective code blocks. For example, a first code block 611-1 may include a hash of AAA, a second code block 611-2 may include a hash of BBB, a third code block 611-3 may include a hash of CCC, and a fourth code block 611-4 may include a hash of DDD.

The second area 612 may be a memory region for loading an original code block of a compromised code block (e.g., a reserved area), when any one of the code blocks loaded on the first area is compromised.

Meanwhile, the secure region 620 may include various modules for security. Specifically, the secure region 620 may include a FHM 621, a FIM 622, and a hash table 623.

As described above, the FIM 622 and the hash table 623 may be used to check integrity of the code blocks loaded on the first area 611. The hash table 623 may store hashes of the code blocks loaded on the first area 611. The processor 120 may control the FIM 622 to determine whether or not the hash included in each of the code blocks of the first area 611 is the same as the hash of the hash table 623. In a case in which the hash of each of the code blocks is the same as the hash of the hash table, the processor 120 may determine that the code blocks are not compromised. In a case in which the hash of each of the code blocks is different from the hash of the hash table, the processor 120 may determine that the code blocks are compromised. Here, the FIM 622 may check the integrity of the code blocks per a predetermined time.

The FHM 621 is a module for controlling an occurred fault when the fault occurs while the processor operates in the normal world. As described above, the processor 120 may control the FHM 621 to determine a memory address at which the fault occurs, a reason that the fault occurs, and an operation in the normal world corresponding to the occurred fault (for example, an operation of newly designating a memory address to be accessed or stopping the operation in the normal world).

Figure 7A:
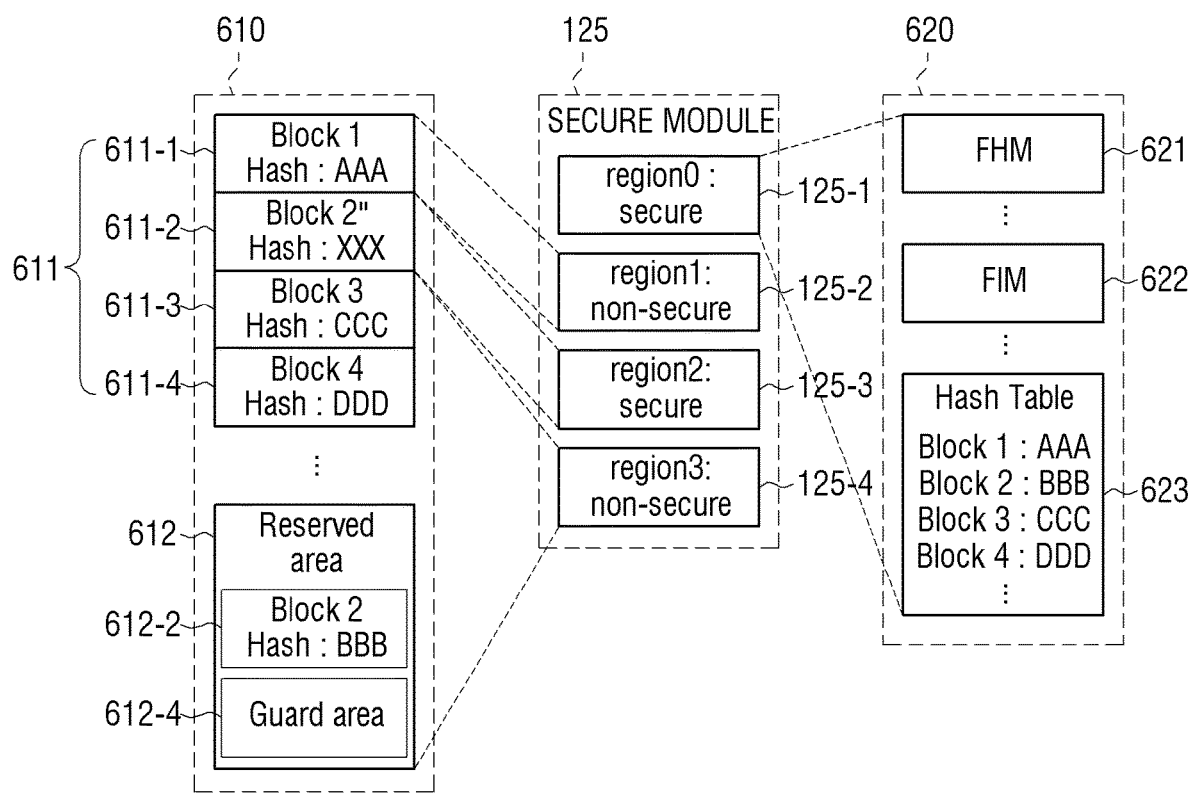
FIGS. 7A and 7B are illustrative diagrams for describing a method for loading an original code block of a compromised code block to a second region when the code block is compromised, according to various embodiments of the disclosure.
Figure 7B:
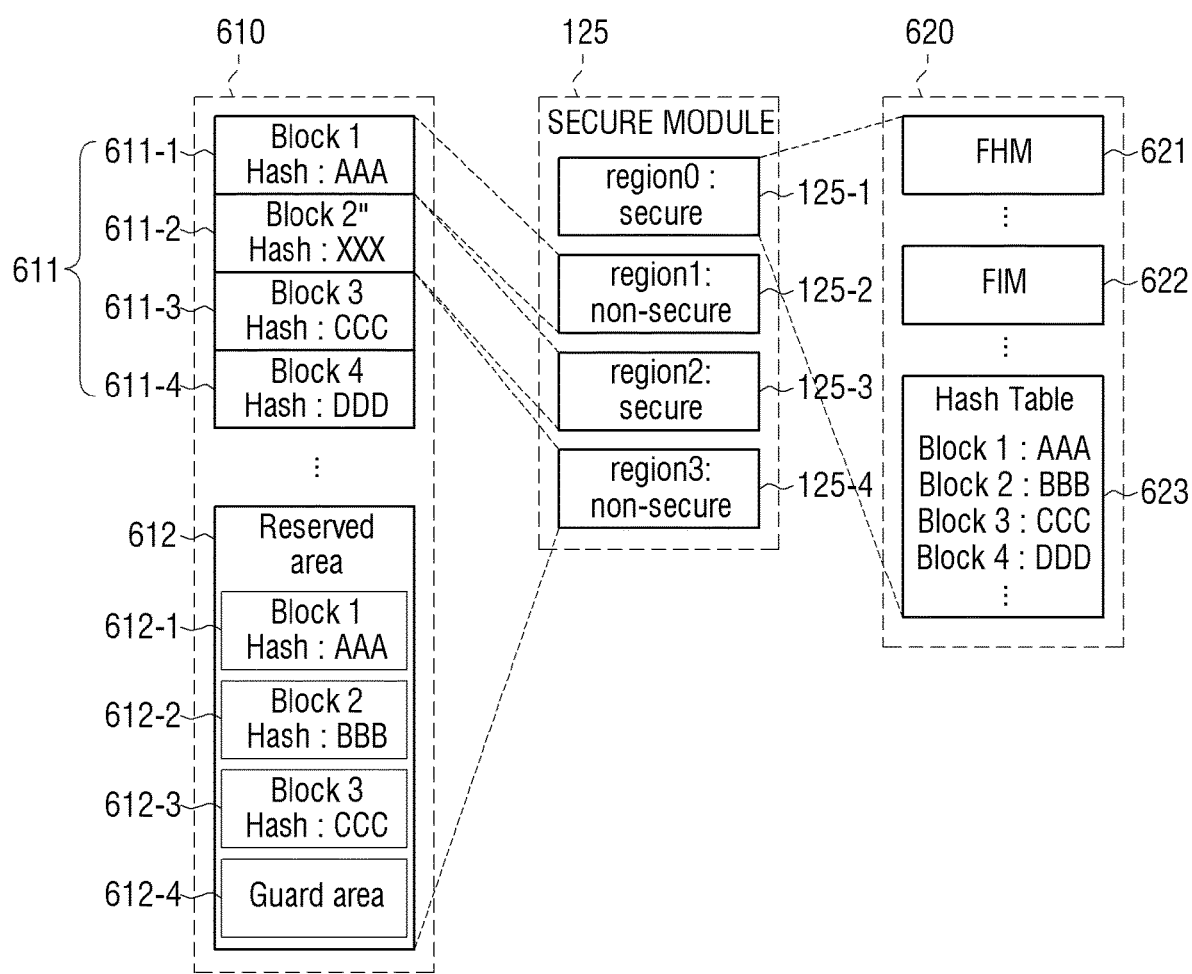

FIGS. 7A and 7B are illustrative diagrams for describing a method for loading an original code block of a compromised code block to a second region when the code block is compromised, according to an embodiment of the disclosure.

Referring to FIG. 7A, in a case in which the hash of the second code block 611-2 is compromised from BBB to XXX due to an external attack, the FIM 622 may check that the hash of the second code block BBB stored in the hash table 623 is different from the hash XXX of the second code block 611-2, and determine that the second code block is compromised.

If it is determined that the second code block 611-2 is compromised, the processor 120 may change a memory region corresponding to the compromised second code block 611-2 to the secure region. The security module 125 may be controlled. That is, as illustrated in FIG. 7A, the security module 125, the secure module may map the FHM 621, the FIM 622, and the hash table 623 to the first secure management region 125-1, map the memory region corresponding to the first code block 611-1 to the second non-secure management region 125-2, map the memory region corresponding to the compromised second code block 611-2 to a third secure management region 125-3, and map the memory regions corresponding to the third code block 611-3 and the fourth code block 611-4 to the second area 612 to a fourth non-secure management region 125-4.

Meanwhile, if it is determined that the second code block 611-2 is compromised, the processor 120 may copy an original code of the second code block from the memory (for example, ROM) in which the original code of the second code block is stored, and load the copied original code on the second area 612. The second code block loaded on the second area is referred to as a second original code block 612-2 for convenience. However, it is apparent that the second original code block 612-2 is merely one obtained by copying the original code of the second code block stored in the ROM or the like, and is not the original code itself of the second code block stored in the ROM or the like.

Meanwhile, the loading of the second original code block 612-2 on the second area 612 may operate in the secure world. That is, the processor 120 may control the security module 125 to load the second original code block 612-2 on the second area 612. However, the loading of the second original code block 612-2 is not limited thereto, but may also operate in the normal world, if necessary.

Meanwhile, the second area 612 may further load a secure area block 612-4 (e.g., a guard area) together with the second original code block 612-2. In a case in which the processor 120 completes the access to the second original code block 612-2, the secure area block 612-4 may include a source code used to access the third code block 611-3 of the first area 611. A detailed description of the secure area block 612-4 will be provided below with reference to FIGS. 8A to 9B.

Referring to FIG. 7B, in order to support a PC_relative addressing, the processor 120 may load original code blocks of the code blocks 611-1 and 611-3 before and after the compromised second code block 611-2 on the second area 612. That is, on the second area 612, the first to third original code blocks 621-1 to 621-3 and the secure area block 621-4 may be loaded.

Here, the PC_relative addressing means a method of calculating an address by adding a PC value and a sum of constants in an instruction. In this case, when only the compromised second code block 611-2 is loaded on the second area 612 as illustrated in FIG. 7A, a problem may occur.

For example, it may be assumed that a size of each of the code blocks loaded on the first area 611 is 20 bytes, a start address of the first code block is 1, and a start address of the second original code block 612-2 loaded on the second area 612 is 101. In this case, a start address of the second code block 611-2 may be 21, a start address of the third code block 611-3 may be 41, and a start address of the fourth code block 611-4 may be 61. In a case in which the code blocks are not compromised, the processor 120 may access the start address of the first code block to sequentially access the plurality of code blocks.

Here, it may be assumed that a 35-th address of the second code block 611-2 includes an instruction to jump 8 bytes from a current address backward and a 45-th address of the third code block 611-3 includes an instruction to jump 9 bytes from the current address forward.

In this case, the processor 120 may access the 35-th memory address of the second code block 611-2 and then jump to a 43-th memory address of the third code block 611-3, and may access 44 and 45-th memory addresses and then jump to a 36-th memory address of the second code block 611-2.

However, in a case in which the second code block 611-2 is compromised, the processor 120 accesses the start address of the second original code block 612-2 instead of accessing the start address of the second code block 611-2. Here, an instruction to jump 8 bytes from a current address backward exists at a 115-th address of the memory 110. Therefore, the processor 120 accesses a 123-th address of the memory 110, but since data loaded on the 123-th address of the memory 110 is different from data loaded on a 43-th address of the memory 110, a problem may occur.

In order to solve the problem, as illustrated in FIG. 7B, the processor 120 may load original code blocks 612-1 and 612-3 of the code blocks 611-1 and 611-3 before and after the compromised second code block 611-2 on the second area 612. That is, in a case in which the compromised code block includes an instruction to jump to other code blocks, the processor 120 may load the original code block of the compromised code block and original code blocks of other code blocks together on the second area 612. FIG. 7B describes the case in which only the code blocks 611-1 and 611-3 before and after the compromised second code block 611-2 are loaded on the second area 612, but the disclosure is not limited thereto. That is, the processor 120 may analyze a jump instruction included in the compromised code block and determine the code block loaded on the second area 612 according to a length of the jumped memory address.

Figure 8A:
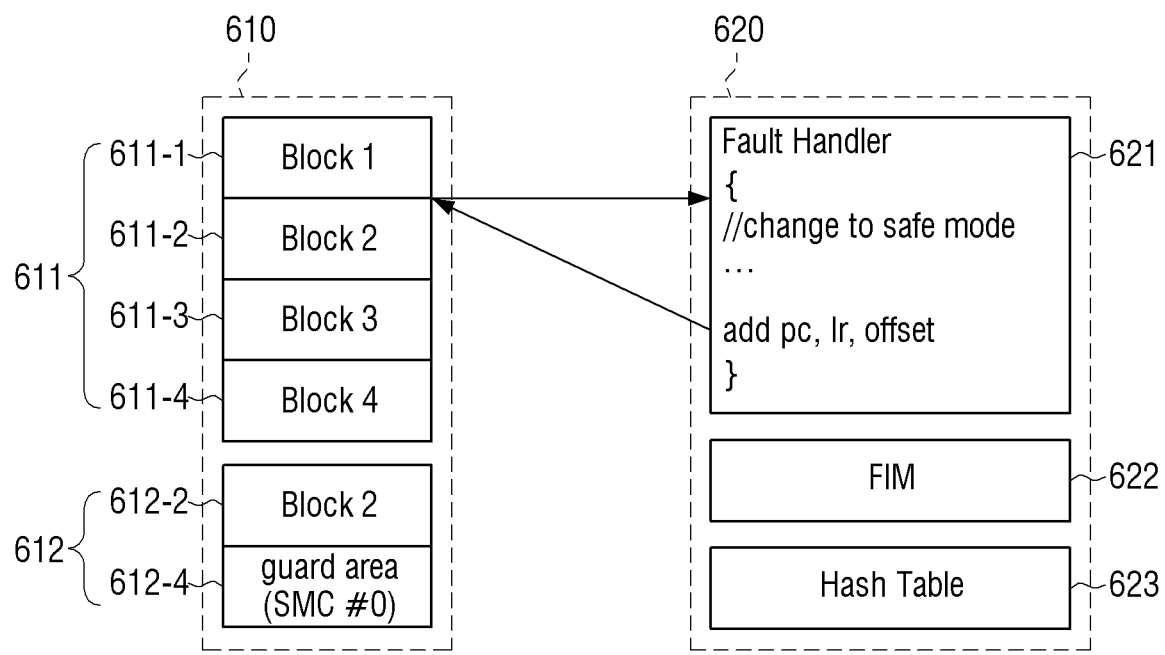
FIGS. 8A, 8B, 9A, and 9B are illustrative diagrams for describing an operation method of a processor according to an embodiment of the disclosure.
Figure 8B:
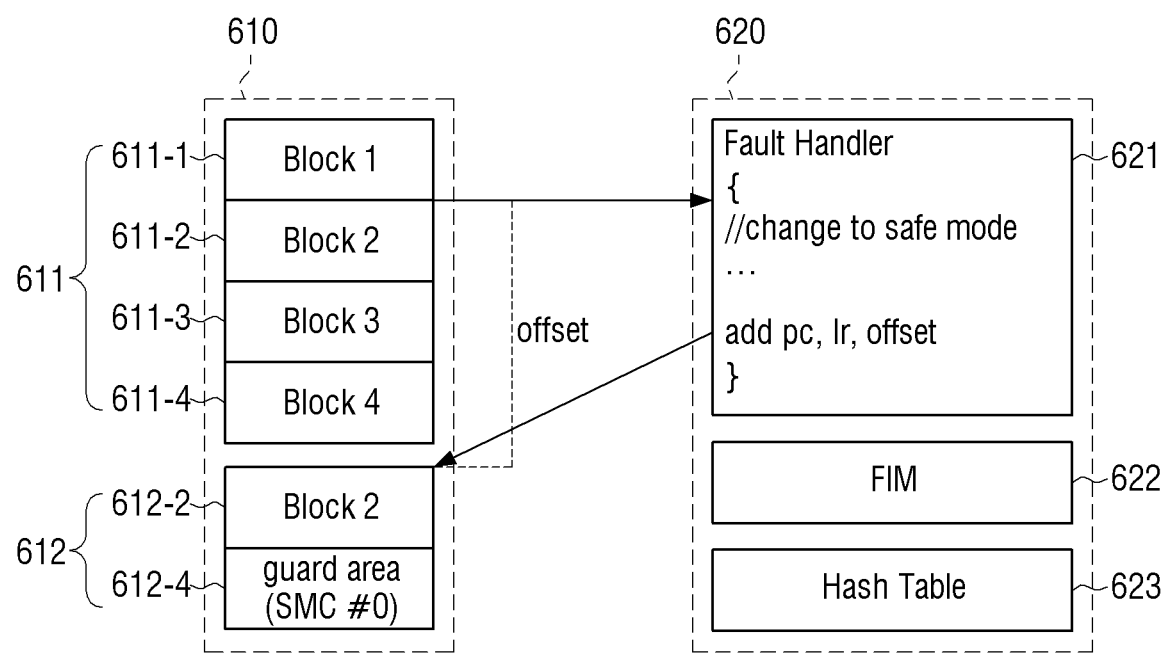
Figure 9A:
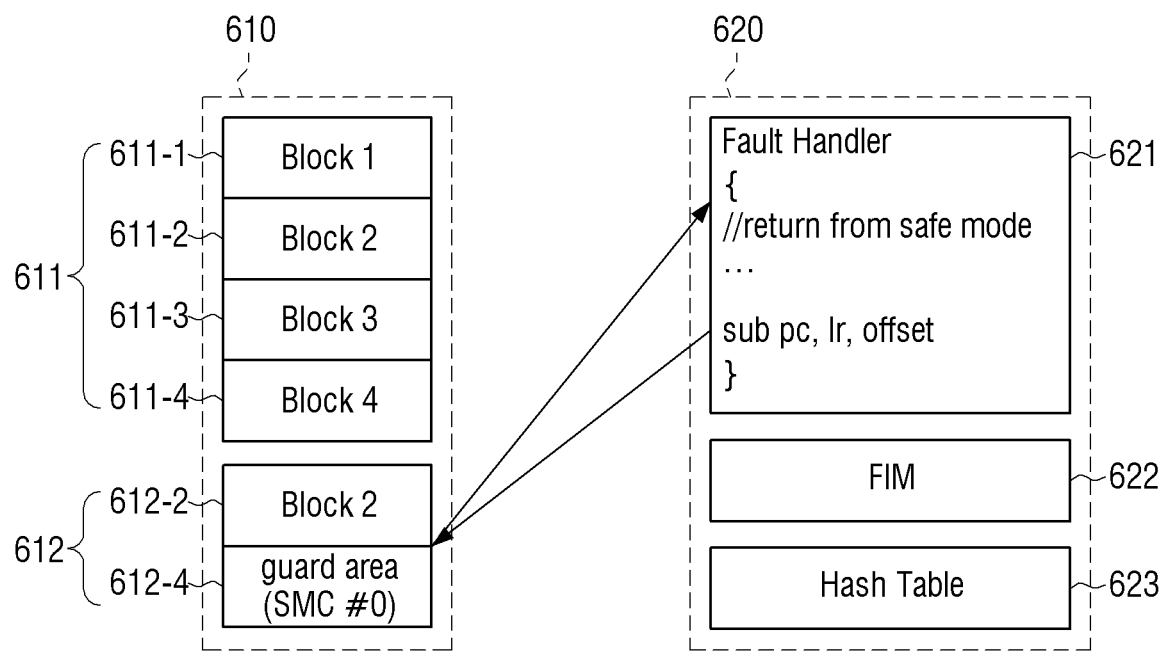
Figure 9B:
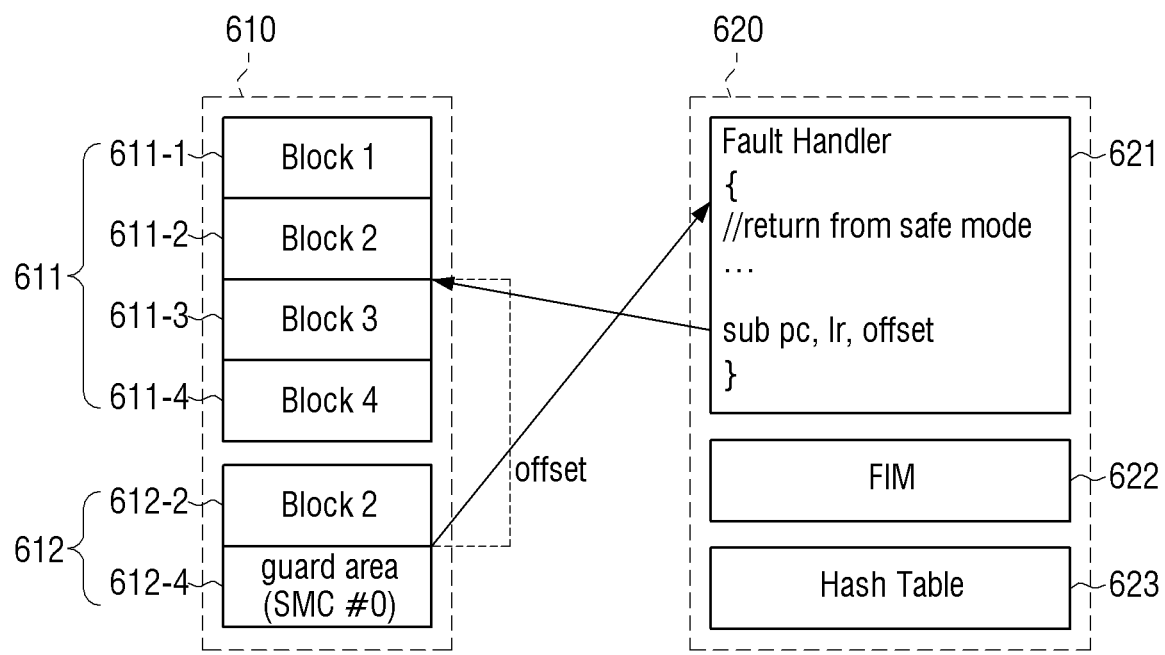

FIGS. 8A, 8B, 9A, and 9B are illustrative diagrams for describing an operation method of a processor according to an embodiment of the disclosure. Referring to FIGS. 8A and 8B are illustrative diagrams for describing an operation of a processor of a case in which the processor 120 accesses the start address of the compromised second code block, and FIGS. 9A and 9B are illustrative diagrams for describing a method for accessing the third code block 611-3 after the processor 120 accesses the second original code block 612-2.

Here, although not illustrated in FIGS. 8A to 9B, FIGS. 8A to 9B are described based on a case in which the second code block 611-2 is compromised and a memory region corresponding to the compromised second code block 611-2 is mapped to the third secure management region 125-3, as illustrated in FIG. 7B.

The processor 120 may sequentially access the plurality of code blocks loaded on the first area 611 of the non-secure region while operating in the normal world. After the processor 120 completes the access to the first code block 611-1, the processor 120 accesses the start address of the compromised second code block 611-2. Here, since the processor 120 operates in the normal world and the region of the compromised second code block 611-2 is changed to the secure region, the fault occurs.

Here, in the general case, as illustrated in FIGS. 8A and 9A, if the fault occurs, the processor 120 operates in the secure world, and if a cause of an occurrence of the fault is solved, the processor 120 operates in the normal world and returns to an address at which the fault occurs.

However, according to an embodiment of the disclosure, as illustrated in FIG. 8B, if the fault occurs, the processor 120 may operate in the secure world and may control the FHM 621 to access the start address of the second original code block 612-2 loaded on the second area 612 instead of solving the cause of the occurrence of the fault. Specifically, if the fault occurs, the processor 120 may calculate a difference value (hereinafter, referred to as an offset) between the start address of the second original code block 612-2 and the start address of the second code block 611-2, and change fault return address to the start address of the second original code block 612-2 based on the calculated offset.

Meanwhile, while the processor 120 operates in the secure world, the processor 120 may access the second original code block 612-2 of the second area. If the processor 120 completes the access to the second original code block 612-2, the processor 120 accesses a start address of a secure area block of the second area 612. If the processor 120 accesses a start address of a secure area block 612-4, the fault may occur. Here, the occurred fault may be a fault generated from the secure area block 612-4 itself unlike FIGS. 8A and 8B. That is, there is a difference that the fault that occurred in FIGS. 8A and 8B is the fault that occurred by accessing, by the processor 120, the secure region while operating in the normal world, but the fault which occurred in FIGS. 9A and 9B is the fault that occurred by the secure area block 612-4.

Referring to FIG. 9B, in a case in which the processor 120 accesses the secure area block 612-4 and the fault occurs, the processor 120 may operate in the secure world. Here, the processor 120 may control the FHM 621 to access the start address of the third code block 611-3 loaded on the first area 611. Specifically, if the fault occurs, the processor 120 may calculate an offset of the start address of the secure area block 612-4 and the start address of the third code block 611-3, and change the fault return address to the start address of the third code block 611-3 based on the calculated offset.

Meanwhile, FIGS. 8A to 9B describe only the case in which the compromised second code block 611-2 is loaded on the second area 612, but the disclosure is not limited thereto. As an example, as illustrated in FIG. 7B, the original code blocks of the first to third code blocks 611-1 to 611-3 may be loaded on the second area 612. In this case, if the processor 120 accesses the secure area block 612-4 and the fault occurs, the processor 120 may control the FHM 621 to change the start address of the secure area block 612-4 to the start address to the fourth code block 611-4. That is, in the case of FIG. 7B, since the processor 120 accesses the third original code block 612-3 and then accesses the secure area block 612-4, the processor 120 may determine a return address as the start address of the fourth code block 611-4.

However, the disclosure is not limited to the above-mentioned example, but the processor 120 may also determine the return address as the third code block 611-3. For example, in a case in which the code blocks are loaded on the second area 612 in the order of the first original code block 611-1, the second original code block 612-2, the secure area block 612-4, and the third original code block 611-3, the processor 120 may determine the return address as the third code block 611-3.

Figure 10:
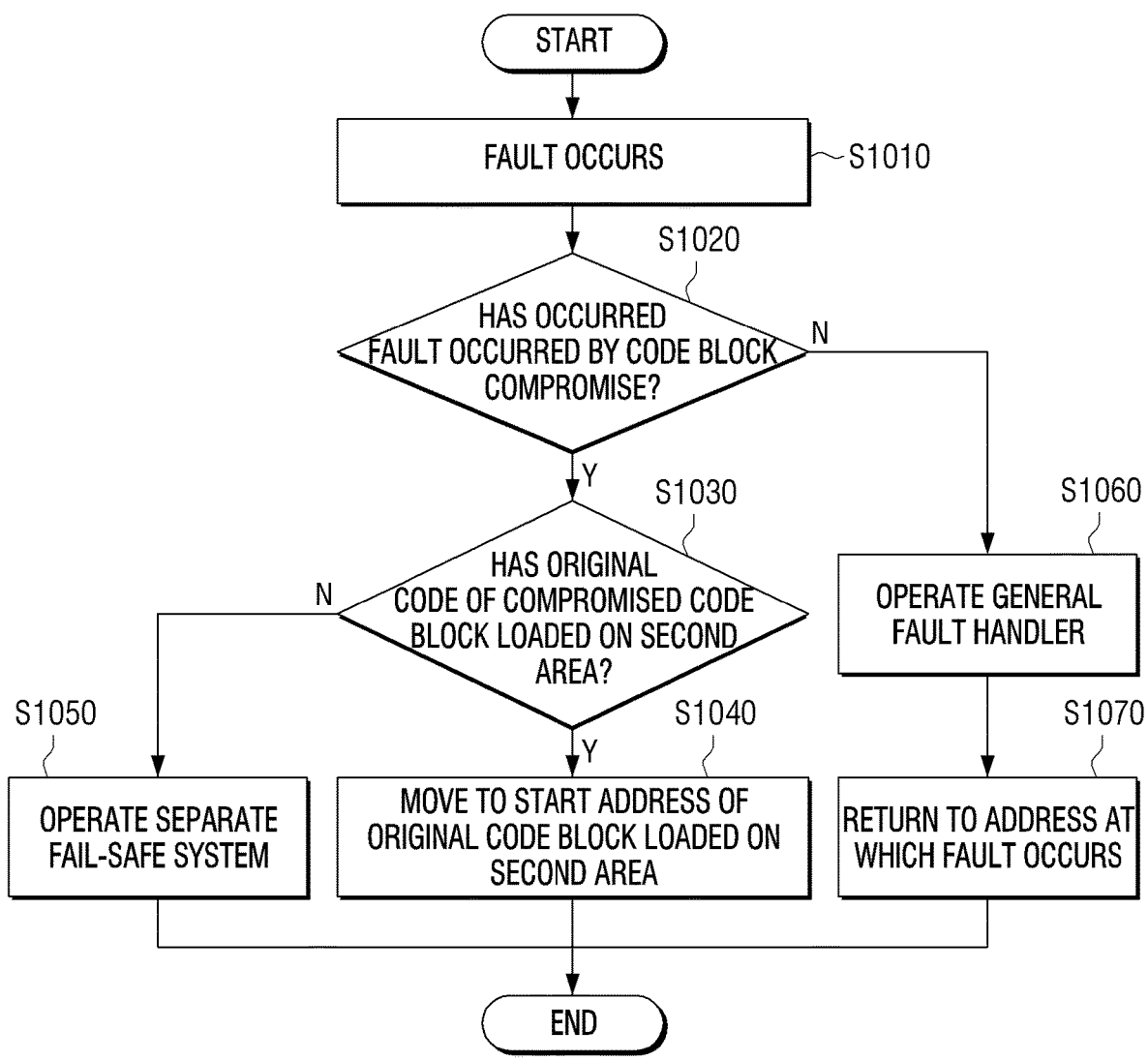
FIG. 10 is a flowchart for describing an operation of a processor according to a cause of an occurrence of a fault according to various embodiments of the disclosure.

FIG. 10 is a flowchart for describing an operation of a processor according to a cause of an occurrence of a fault according to an embodiment of the disclosure.

If the fault occurs operation S1010, the processor 120 may determine whether or not the occurred fault is a fault that occurred by a code block compromise operation S1020.

If the occurred fault is not the fault that occurred by the code block compromise operation No in S1020, the processor 120 performs a general fault control operation S1060.

If a cause of the occurrence of the fault is solved, the processor 120 may return to an address at which the fault occurs operation S1070. For example, while the processor 120 accesses the memory 110 and executes the program, since the code block that should have been loaded is not loaded, the fault may occur. In this case, the processor 120 may load the corresponding code block on the memory 110 and then return to the address at which the fault occurs.

Meanwhile, if the occurred fault is a fault that occurred by the code block compromise Yes in operation S1020, the processor 120 may determine whether or not the original code of the compromised code block is loaded on the second area operation S1030.

If the original code of the compromised code block is loaded on the second area Yes in operation S1030, the processor 120 may access a start address of the original code block loaded on the second area operation S1040. A specific method by which the processor 120 accesses the start address of the original code block loaded on the second area is as described above.

Meanwhile, if the original code of the compromised code block is not loaded on the second area No in operation S1030, the processor 120 may execute a separate fail-safe system. For example, if a specific code block is compromised and the compromised code block is not loaded on the second area, the processor 120 may stop a master OS and execute a slave OS. Alternatively, the processor 120 may stop the operation of the system, upgrade firmware, and then reboot the system.

Figure 11:
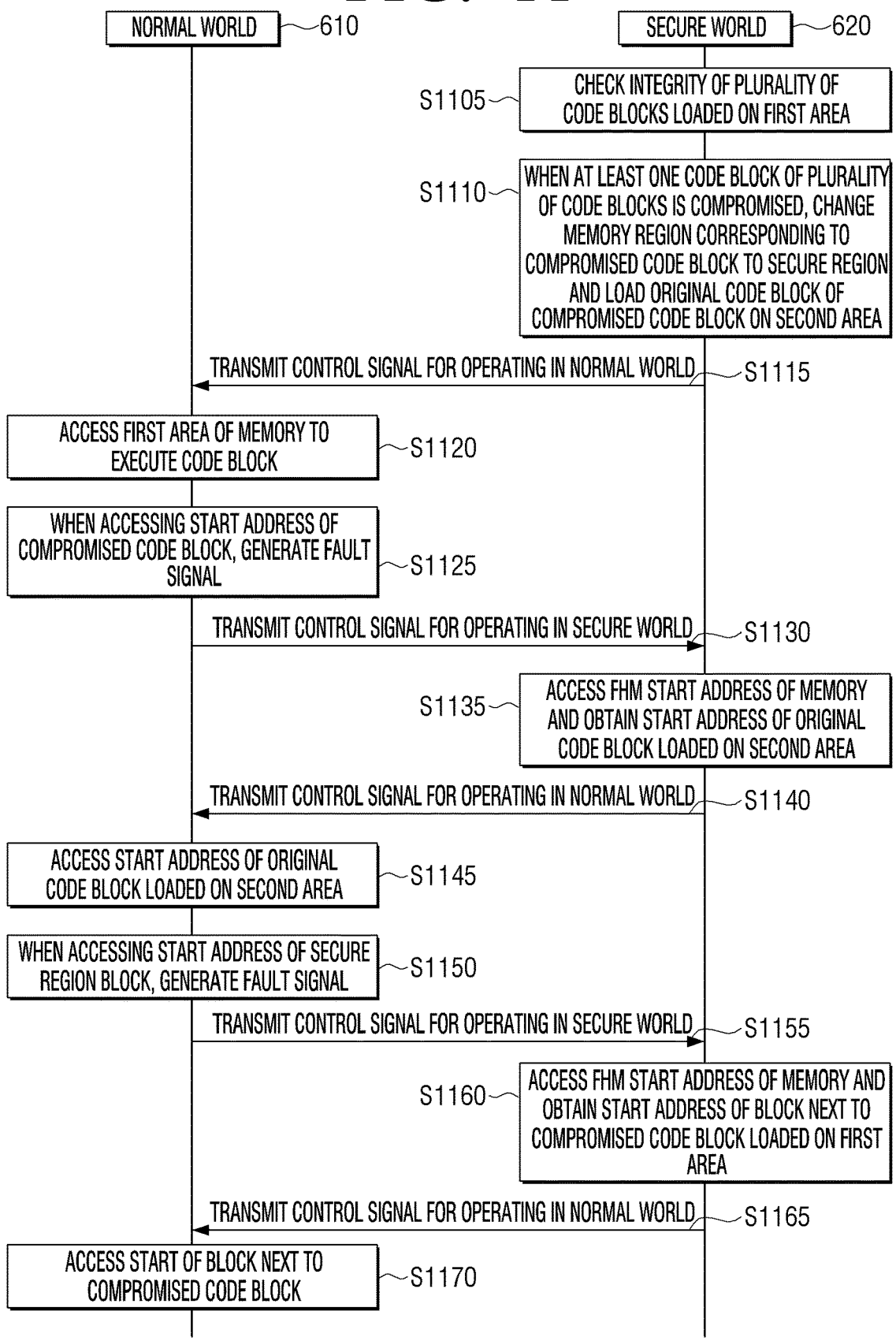
FIG. 11 is a flowchart for describing an operation of a processor according to an embodiment of the disclosure.

FIG. 11 is a flowchart for describing an operation of a processor according to an embodiment of the disclosure.

Referring to FIG. 11 is a flowchart for describing whether the operations described above operate in the normal world or the secure world.

While the processor 120 operates in the secure world, the processor 120 may check integrity of a plurality of code blocks loaded on the first area of the memory operation S1105. As described above, the integrity check may be performed per a predetermined time.

In a case in which at least one code block of the plurality of code blocks is compromised while the processor 120 operates in the secure world, the processor 120 may change a memory region corresponding to the compromised code block to the secure region, and may load an original code block of the compromised code block on a second area operation S1110.

If the operation of the processor 120 is switched from the secure world to the normal world operation S1115, the processor 120 may access the first area of the memory to execute the code block operation S1120.

If the processor 120 accesses a start address of the compromised code block while operating in the normal world, the processor 120 may generate a fault signal operation S1125.

If the fault signal is generated, the operation of the processor 120 may be switched from the normal world to the secure world operation S1130 and the processor 120 may access a FHM start address of the memory 110 to obtain the start address of the original code block loaded on the second area operation S1135.

If the operation of the processor 120 is again switched from the secure world to the normal world operation S1140, the processor 120 may access the start address of the original code block loaded on the second area operation S1145.

If the processor 120 accesses a start address of the secure area block while operating in the normal world, the processor 120 may generate the fault signal operation S1150.

If the fault signal is generated, the operation of the processor 120 may be switched from the normal world to the secure world operation S1155 and the processor 120 may access the FHM start address of the memory 110 to obtain a start address of a block next to the compromised code block loaded on the first area operation S1160.

If the operation of the processor 120 is again switched from the secure world to the normal world operation S1165, the processor 120 may access the start address of the block next to the compromised code block operation S1170.

Figure 12A:
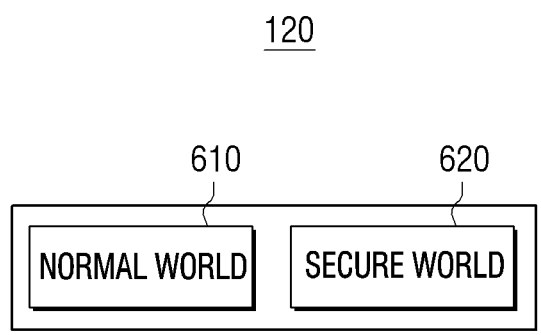
FIGS. 12A and 12B are illustrative diagrams for describing various kinds of processors according to various embodiments of the disclosure.
Figure 12B:
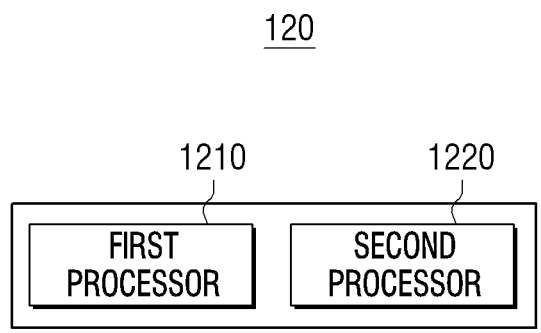
Figure 13:
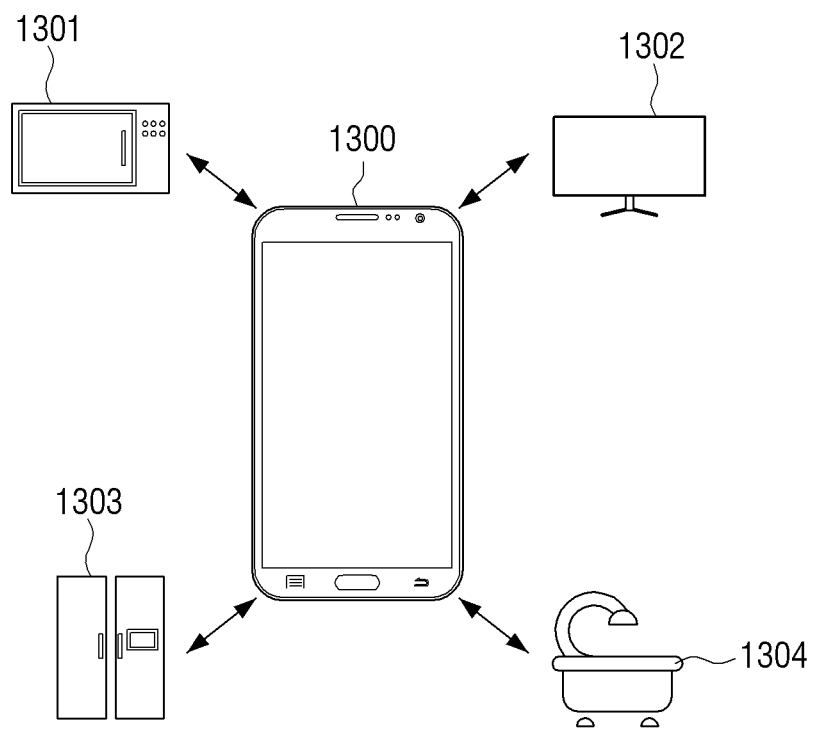
FIGS. 13, 14A, 14B, and 14C are illustrative diagrams for describing a security system according to various embodiments of the disclosure.

Meanwhile, the disclosure describes a case in which one processor 120 selectively operates in one of the non-secure region 610 (normal world) and the secure region 620 (secure world) as illustrated in FIG. 12A, but the disclosure is not limited thereto. For example, as illustrated in FIG. 12B, the processor 120 may include a first processor 1210 and a second processor 1220. Here, the first processor 1210 may perform an operation corresponding to the normal world and the second processor 1220 may perform an operation corresponding to the secure world. That is, the first processor 1210 may execute a non-secure operation and the second processor 1220 may execute a secure operation. In addition, the second processor 1220 may operate to be isolated from an access from the outside.

FIGS. 13, 14A, 14B, and 14C are illustrative diagrams for describing a secure system according to an embodiment of the disclosure.

Specifically, the electronic device 100 according to the disclosure may be various electronic devices. The electronic device 100 according to the disclosure may include an electronic device 1300 illustrated in FIG. 13 and a plurality of IOT devices 1301 to 1304 connected to the electronic device 1300.

Here, the plurality of IOT devices 1301 to 1304 may be low specification electronic products in some cases. When the number of the compromised code blocks is increased, the number of the code blocks loaded on the second area of the memory 110 may also be increased and a memory space may become insufficient. Therefore, the electronic device 1300 that manages the plurality of IOT devices 1301 to 1304 may arrange the memory space of the plurality of IOT devices 1301 to 1304 in some cases.

Figure 14A:
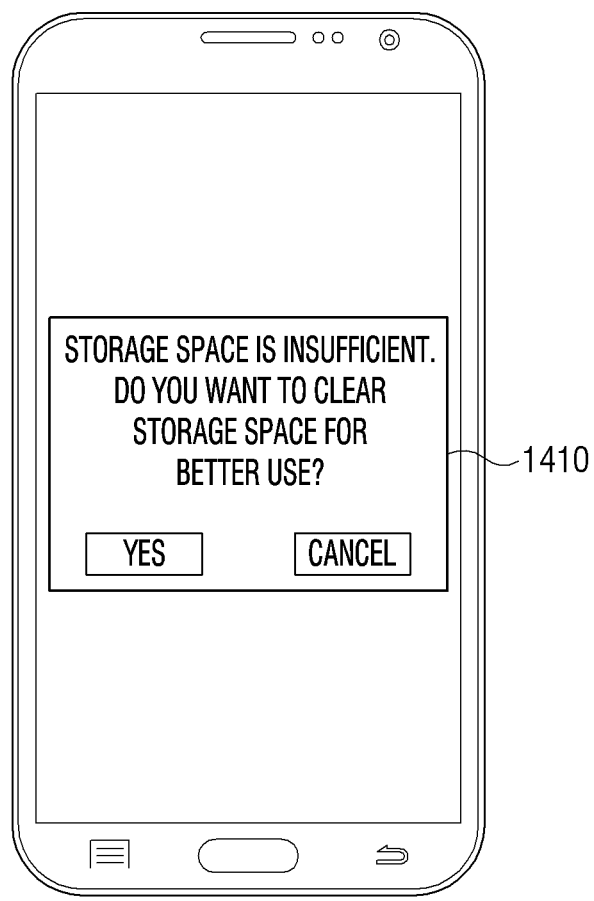

Referring to FIG. 14A, when the memory space of any one of the plurality of IOT devices is insufficient, the electronic device 1300 may display a UI 1410 notifying the insufficient memory.

Figure 14B:
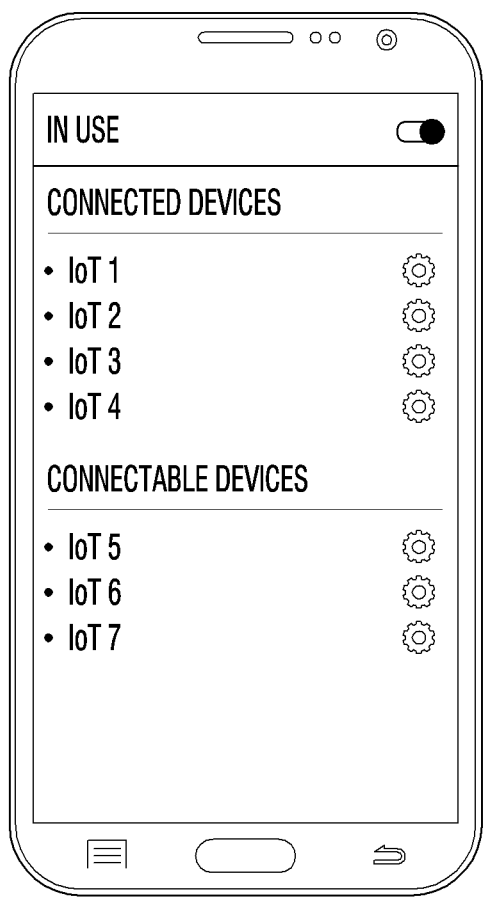

If a user command (for example, a command touching a yes button) for the UI 1410 notifying the insufficient memory is input, the electronic device 1300 may display a list of the plurality of IOT devices 1301 to 1304 which are being managed, as illustrated in FIG. 14B.

Figure 14C:
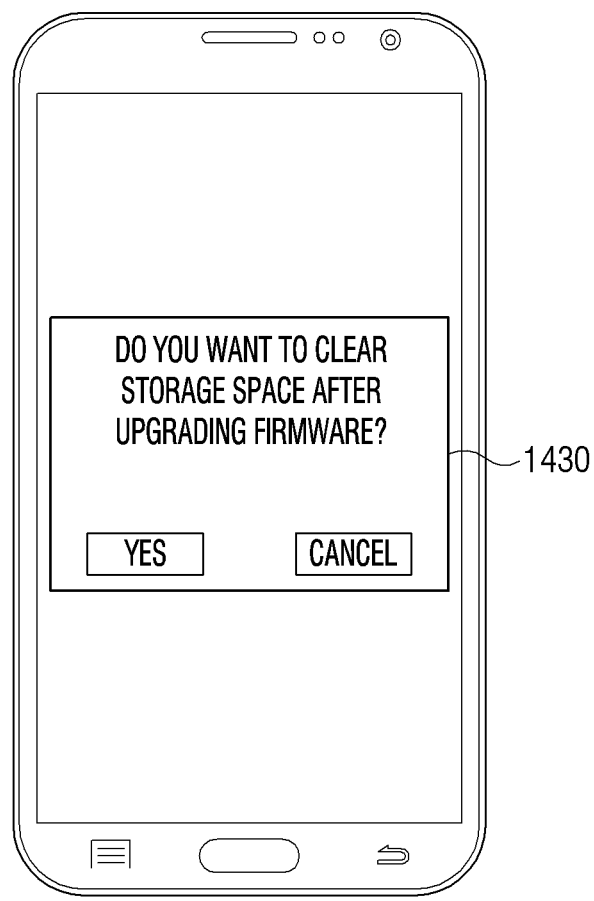

Referring to FIG. 14C, if any one list of the list of the plurality of IOT devices 1301 to 1304 is selected, the electronic device 1300 may display a UI 1430 for arranging a memory of the IOT device corresponding to the selected list. Here, the electronic device 1300 may perform a firmware upgrade for solving a problem of the compromised code block together, if necessary. That is, the electronic device 1300 may patch the compromised code block before deleting the original code block for the compromised code block to thereby remove the original code block after taking an action so that the code block is not compromised even if the same attack occurs. Therefore, the plurality of IOT devices 1301 to 1304 may safely perform a function of the device through the firmware upgrade or the like immediately after the code block is compromised, and may periodically perform the firmware upgrade only when necessary.

Meanwhile, although the embodiment described above describes the method of managing the memories of the plurality of IOT devices 1301 to 1304, the method described above may also be applied to the electronic device 1300 in the same way.

Figure 15:
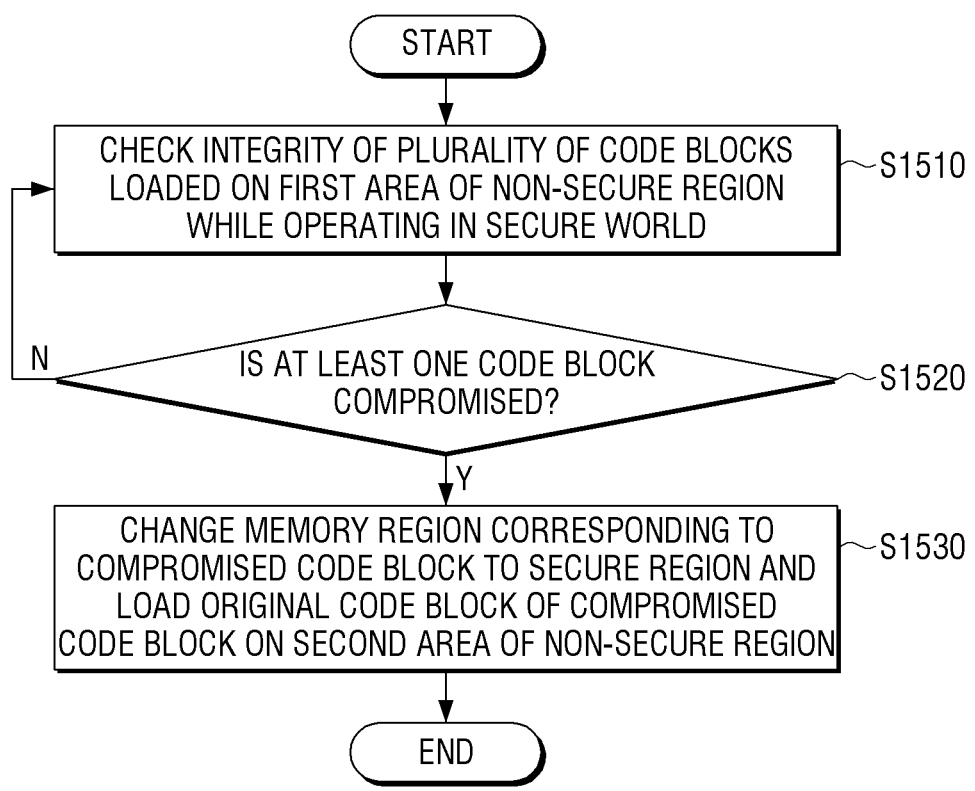
FIG. 15 is a flowchart of describing a method of determining, by an electronic device, whether or not a code block is compromised according to an embodiment of the disclosure.

FIG. 15 is a flowchart of describing a method of determining, by an electronic device, whether or not a code block is compromised according to an embodiment of the disclosure.

The electronic device 100 may check integrity of a plurality of code blocks loaded on the first area of the non-secure region while operating in the secure world operation S1510. Here, the integrity check may be performed by comparing a hash of each of the plurality of code blocks with a hash of the hash table loaded on the secure region.

As a result of performing the integrity check, if the code block is not compromised No in operation S1520, the electronic device returns to the operation S1510. That is, the electronic device 100 may determine whether or not the code block is compromised per a predetermined time.

If at least one code block is compromised Yes in operation S1520, the electronic device 100 may change a memory region corresponding to the compromised code block to the secure region, and load an original code block of the compromised code block on the second area of the non-secure region operation S1530.

Figure 16:
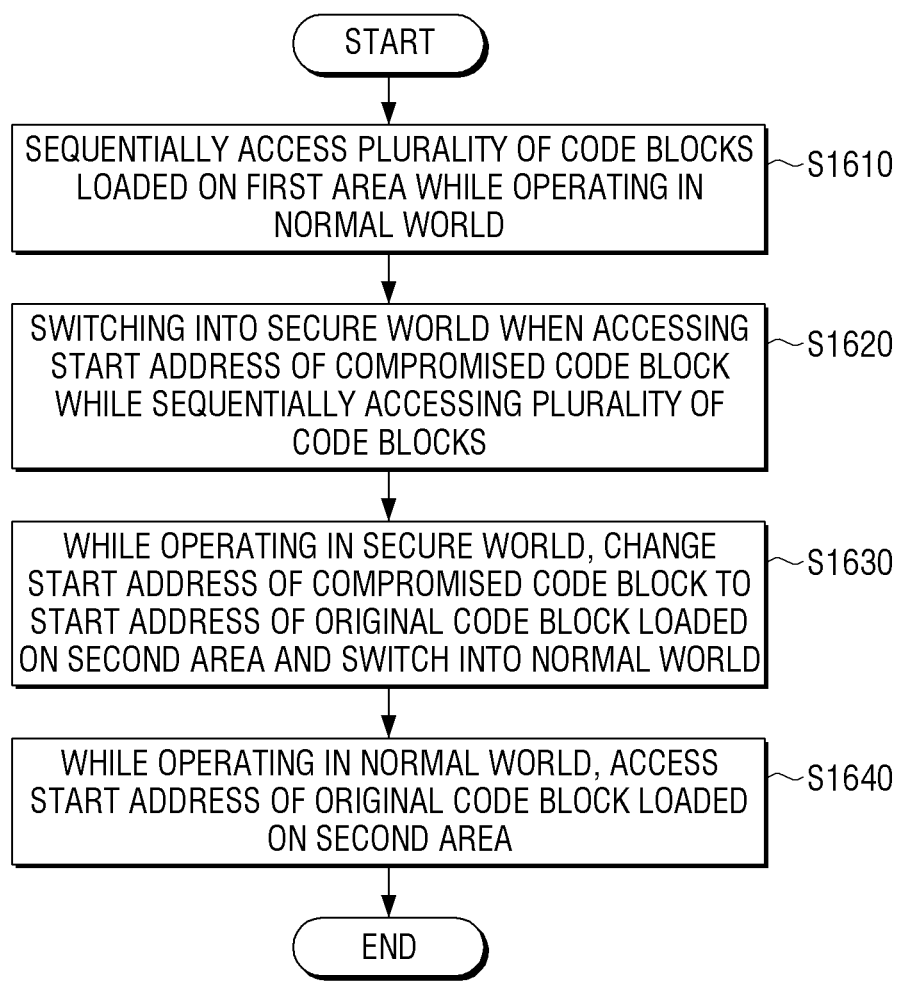
FIG. 16 is a flowchart for describing a process of accessing, by a processor, a second region according to an embodiment of the disclosure.

FIGS. 16 and 17 are illustrative diagrams for describing an operation of the electronic device of a case in which the compromised code block occurs, according to an embodiment of the disclosure.

FIG. 16 is a flowchart for describing a process of accessing, by a processor, a second area.

The compromised code block is loaded on the second area by the process of FIG. 15, and the processor 120 may sequentially access the plurality of code blocks loaded on the first area while operating in the normal world operation S1610.

If the processor 120 accesses a start address of the compromised code block while sequentially accessing the plurality of code blocks, the processor 120 may be switched into the secure world operation S1620.

The processor 120 may change the start address of the compromised code block to a start address of an original code block loaded on the second area while operating in the secure world, and may be switched into the normal world operation S1630.

While the processor 120 operates in the normal world, the processor 120 may access the start address of the original code block loaded on the second region operation S1640.

FIG. 17 is a flowchart for describing a process of again accessing, by the processor, a first area from the second area.

In a case in which the processor 120 accesses a last address of the original code block of the compromised code block loaded on the second area while operating in the normal world, the processor 120 may be switched into the secure world operation S1710. Here, the case in which the processor 120 accesses the last address of the original code block may include a case in which the processor 120 accesses a start address of a secure area block that exists next to the original code block.

While the processor 120 operates in the secure world, the processor 120 may change a start address of a code block next to the original code block loaded on the second region to a start address of a code block next to the compromised code block loaded on the first region and may be switched into the normal world operation S1720.

While the processor 120 operates in the normal world, the processor 120 may access a start address of a next code block of the first area operation S1730.

The device (e.g., the modules or the electronic device 100) or the method (e.g., the operations) according to the diverse embodiments may be performed, for example, by at least one computer (e.g., the processor 120) executing instructions included in at least one program of programs maintained in a non-transitory computer-readable storage media.

If the instructions are executed by the computer (e.g., the processor 120), the at least one computer may perform functions corresponding to the instructions. In this case, the non-transitory computer-readable storage media may be, for example, the memory 110.

The program may be included in the non-transitory computer-readable storage media such as, for example, a hard disk, a floppy disk, a magnetic media (e.g., a magnetic tape), an optical media (e.g., a compact disc read only memory (CD-ROM), a digital versatile disc (DVD)), a magneto-optical media (e.g., a floptical disk), a hardware device (e.g., a read only memory (ROM), a random access memory (RAM), a flash memory, or the like), and the like. In this case, the storage media may be generally included as a portion of the configuration of the electronic device 100, but may also be mounted through a port of the electronic device 100 or may also be included in an external device (e.g., a cloud server or other electronic devices) located outside of the electronic device 100. In addition, the program may also be divided to be stored in a plurality of storage media, and in this case, at least some of the plurality of storage media may also be positioned in the external device of the electronic device.

The instructions may include a high-level language code capable of being executed by a computer using an interpreter, or the like, as well as a machine language code made by a compiler. The above-mentioned hardware device may be constituted to be operated as one or more software modules to perform the operations of the diverse embodiments, and vice versa.

While the disclosure has been shown and described with various embodiments thereof, it will be understood by those skilled in the art that various changes in form and details may be made therein without departing from the spirit and the scope of the disclosure as defined by the appended claims and their equivalents.

What is claimed is:

1. An electronic device comprising:
    a memory configured to include a non-secure region operating in a normal world and a secure region operating in a secure world; and
    a processor configured to:
        selectively operate in one of the normal world and the secure world,
        check integrity of a plurality of code blocks loaded on a first area of the non-secure region while operating in the secure world, and
        when one of the plurality of code blocks is compromised:
            change a memory region corresponding to a compromised code block to the secure region, and
            load an original code block of the compromised code block on a second area of the non-secure region.

2. The electronic device as claimed in claim 1, wherein the processor is further configured to:
    sequentially access the plurality of code blocks loaded on the first area while operating in the normal world, and
    switch to operate in the secure world when accessing a start address of the compromised code block while sequentially accessing the plurality of code blocks.

3. The electronic device as claimed in claim 2, wherein the processor is further configured to:
    change the start address of the compromised code block to a start address of the original code block loaded on the second area and switch into the normal world from the secure world, and
    access the start address of the original code block loaded on the second area while operating in the normal world.

4. The electronic device as claimed in claim 3, wherein the processor is further configured to:
    switch into the secure world when accessing a last address of the original code block of the compromised code block loaded on the second area from the normal world,
    change a start address of a code block next to the original code block loaded on the second area to a start address of a code block next to the compromised code block loaded on the first area,
    switch into the normal world from the secure world, and
    access the start address of the next code block of the first area while operating in the normal world.

5. The electronic device as claimed in claim 1,
    wherein the secure region of the memory further includes a firmware integrity check module (FIM) and a hash table corresponding to the plurality of code blocks loaded on the first area, and
    wherein the processor is further configured to check whether or not hashes of the plurality of code blocks loaded on the first area are compromised using the FIM and the hash table while operating in the secure world.

6. The electronic device as claimed in claim 1, wherein, when one of the plurality of code blocks is compromised, the processor is further configured to load the compromised code block and original code blocks of code blocks before and after the compromised code block together on the second area.

7. The electronic device as claimed in claim 2,
    wherein the secure region of the memory further includes a fault control module, and
    wherein the processor is further configured to:
        determine whether or not a fault is a fault that occurred due to the compromise of the compromised code block when the fault occurs while the processor operates in the normal world,
        switch from operating in the normal world to operating in the secure world when the fault occurred due to the compromise of the compromised code block and the original code block of the compromised code block is loaded on the second area, and
        change the start address of the compromised code block to a memory start address of the original code block loaded on the second area while operating in the secure world.

8. The electronic device as claimed in claim 7, wherein, when the fault is not the fault that occurred due to the compromise of the compromised code block, the processor is further configured to access an address at which the fault occurs.

9. The electronic device as claimed in claim 8, wherein, when the fault is the fault that occurred due to the compromise of the compromised code block and the original code block of the compromised code block is not loaded on the second area, the processor is further configured to execute a slave operating system.

10. A control method of an electronic device including a memory, the memory including a non-secure region operating in a normal world and a secure region operating in a secure world, and a processor selectively operating in one of the normal world and the secure world, the control method comprising:
    checking integrity of a plurality of code blocks loaded on a first area of the non-secure region while operating in the secure world; and
    changing a memory region corresponding to a compromised code block to the secure region when one of the plurality of code blocks is compromised and loading an original code block of the compromised code block on a second area of the non-secure region.

11. The control method as claimed in claim 10, further comprising:
sequentially accessing the plurality of code blocks loaded on the first area while operating in the normal world; and
switching into the secure world when accessing a start address of the compromised code block while sequentially accessing the plurality of code blocks.

12. The control method as claimed in claim 11, further comprising:
changing the start address of the compromised code block to a start address of the original code block loaded on the second area and switching into the normal world from the secure world; and
accessing the start address of the original code block loaded on the second area while operating in the normal world.

13. The control method as claimed in claim 12, further comprising:
switching into the secure world when accessing a last address of the original code block of the compromised code block loaded on the second area while operating in the normal world;
changing, while operating in the secure world, a start address of a code block next to the original code block loaded on the second area to a start address of a code block next to the compromised code block loaded on the first area and switching into the normal world; and
accessing the start address of the next code block of the first area while operating in the normal world.

14. The control method as claimed in claim 10, wherein in the checking of the integrity, whether or not the plurality of code blocks are compromised is identified by comparing hash information of the plurality of code blocks with a hash table of the secure region, while operating in the secure world.

15. The control method as claimed in claim 10, wherein in the loading of the original code block of the compromised code block on the second area of the non-secure region, the compromised code block and original code blocks of code blocks before and after the compromised code block are loaded together on the second area.

16. The control method as claimed in claim 11, further comprising:
determining whether or not a fault is a fault that occurred due to the compromise of the compromised code block, when the fault occurs while operating in the normal world;
switching from operating in the normal world to operating in the secure world when the fault is the fault that occurred due to the compromise of the compromised code block and the original code block of the compromised code block is loaded on the second area; and
changing the start address of the compromised code block to a memory start address of the original code block loaded on the second area, while operating in the secure world.

17. The control method as claimed in claim 16, further comprising accessing an address at which the fault occurs when the fault is not the fault that occurred due to the compromise of the compromised code block.

18. The control method as claimed in claim 17, further comprising executing a slave operating system when the fault is the fault that occurred due to the compromise of the compromised code block and the original code block of the compromised code block is not loaded on the second area.

19. A non-transitory computer-readable recording medium including a program for controlling an electronic device, wherein the program when executed by at least one processor of the electronic device is configured to perform a control method of the electronic device, the control method of the electronic device comprising:
checking integrity of a plurality of code blocks loaded on a first area of a non-secure region of memory while operating in a secure world; and
changing a memory region corresponding to a compromised code block to a secure region of memory when one of the plurality of code blocks is compromised and loading an original code block of the compromised code block on a second area of the non-secure region.

20. The non-transitory computer-readable recording medium of claim 19, wherein the control method of the electronic device further comprises:
checking, while operating in the secure world, whether or not hashes of the plurality of code blocks loaded on the first area are compromised using a firmware integrity check module (FIM) and a hash table corresponding to the plurality of code blocks loaded on the first area.

* * * * *